United States Patent [19]
Schlicher et al.

[11] 3,794,846
[45] Feb. 26, 1974

[54] AUTOMATIC SYNCHRONIZING CONTROL SYSTEM

[75] Inventors: David W. Schlicher; Denton C. Rowe, both of Minneapolis, Minn.

[73] Assignee: Electric Machinery Mfg. Company, Minneapolis, Minn.

[22] Filed: Sept. 18, 1972

[21] Appl. No.: 289,791

[52] U.S. Cl..................................... 307/87, 322/24
[51] Int. Cl................................................. H02j 3/08
[58] Field of Search............. 307/87; 322/24, 28, 32

[56] References Cited
UNITED STATES PATENTS

| | | | |
|---|---|---|---|
| 3,599,007 | 8/1971 | Martin | 307/87 |
| 3,601,619 | 8/1971 | Ringstad | 307/87 |
| 3,562,545 | 2/1971 | Rubner | 307/87 |

*Primary Examiner*—James D. Trammell
*Attorney, Agent, or Firm*—Merchant, Gould, Smith & Edell

[57] ABSTRACT

An accurate, miniaturized synchronizing system for automatically connecting an oncoming AC generator in parallel with a three-phase bus source when the generator and bus source output parameters are simultaneously within predetermined phase, frequency and voltage synchronization limits of each other, and for automatically changing the rotational speed and voltage of the oncoming generator to achieve the predetermined synchronizing conditions. Sensing circuits monitor the oncoming generator and bus source output voltages. Pulse generator circuits produce a plurality of phase angle dependent pulse train signals from the sensed output voltage signals. A digital speed matching circuit determines the directional frequency difference between the oncoming generator and bus source signals and provides periodic compensating speed regulating signals to a prime mover of the oncoming generator in response thereto. A voltage matching circuit detects voltage synchronization unbalance between the oncoming generator and bus source output signals, and in response thereto, provides a digital output synchronization signal indicative of the voltage synchronization unbalance, and provides voltage matching control signals to a voltage regulator of the oncoming generator. Phase and frequency synchronizer logic circuits digitally compare the generated pulse train signals and provide therefrom logical phase and frequency synchronization output signals indicative of the phase and frequency unbalance between the oncoming generator and bus source output signals. A synchronizer control logic circuit provides an energizing signal to a circuit breaker for connecting the oncoming generator in parallel with the bus source when the voltage, phase and frequency synchronization output signals simultaneously indicate that the oncoming generator and bus source outputs are within the predetermined synchronization limits. A lockout circuit prevents repeated circuit breaker closure attempts if the circuit breaker fails to close after receiving the first energizing signal from the synchronizer control logic circuit.

38 Claims, 13 Drawing Figures

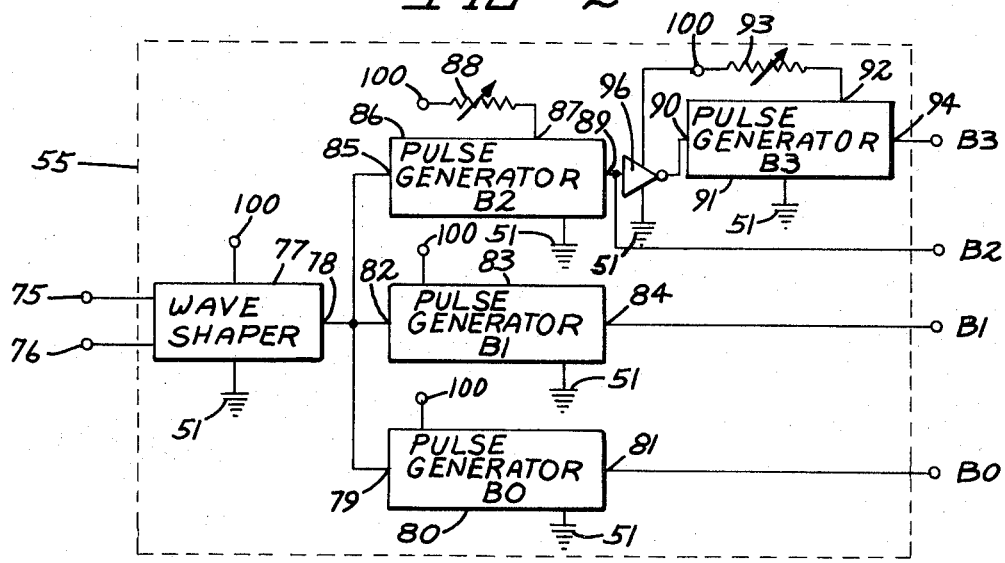
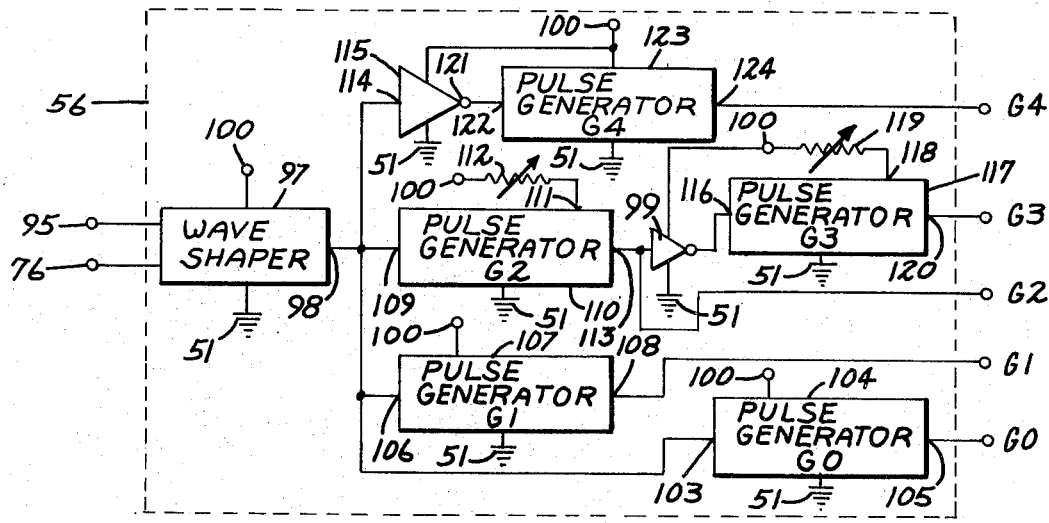
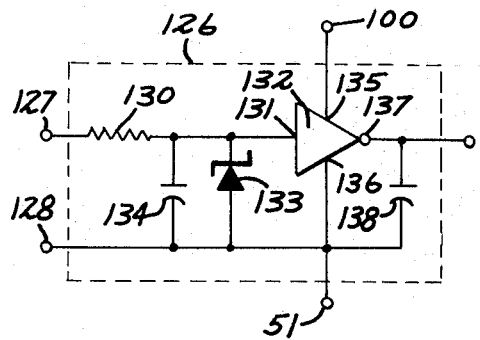
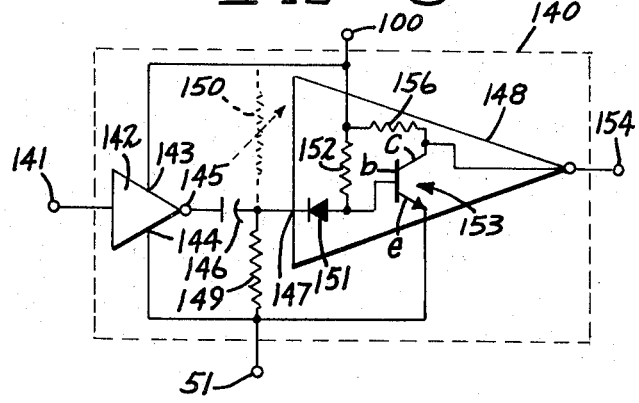

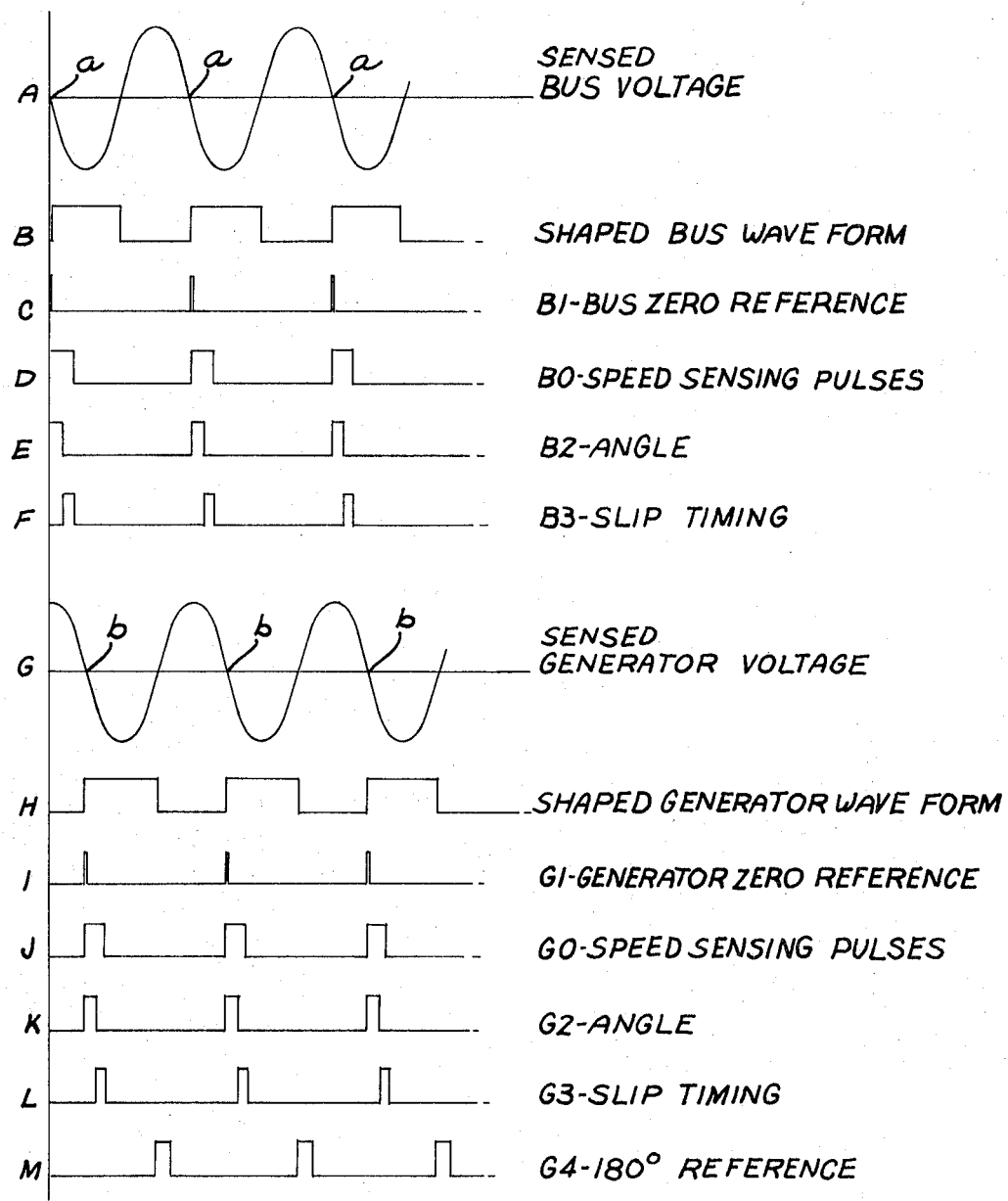
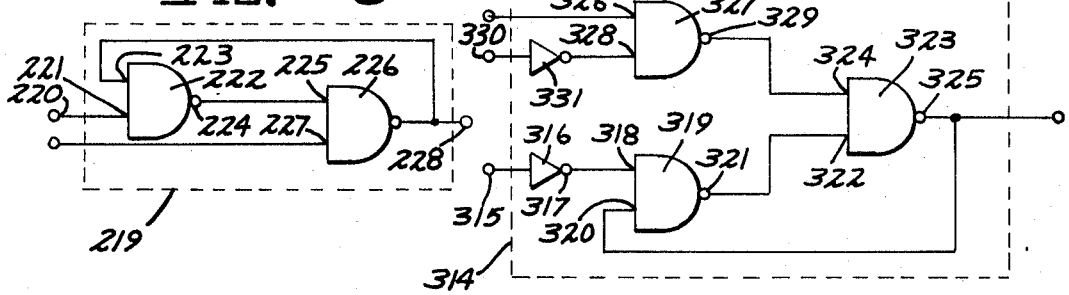

AUTOMATIC SYNCHRONIZING CONTROL SYSTEM

BACKGROUND OF THE INVENTION

Electrical power generating sources are typically comprised of a plurality of single phase or polyphase AC generators connected in parallel to a common set of AC output "bus" lines. In such generating systems it frequently becomes necessary, whether for additional load, reliablity, maintenance or other requirements, to add an "oncoming" generator in parallel with the output bus lines. In connecting the oncoming generator to the bus lines, it is important that the established bus line signal is not disrupted. A steady bus output signal is insured when connecting the oncoming generator to the bus lines, if the phase, frequency and voltage output parameters of the oncoming generator are substantially equal to those of the common bus lines at the instant of connection. Improper parameter matching at the instant of connection can result in direct and consequent multiple damage not only within the parallel generating system itself but also to the machinery powered by the generating system, and can cause unwarranted work stoppage delays caused by dependent machines which automatically turn off upon sensing a bus line power fluctuation. It is well known, that after the oncoming generator has been connected to the bus lines under proper precedent matched parameter conditions, the generating system itself will thereafter provide the necessary self adjusting drive signals to synchronize the newly added generator with the rest of the generator system.

Apparatus for simultaneously monitoring the oncoming generator and the bus source electrical output signal parameters and for indicating when the respective parameters are substantially matched, are typically called synchronizers. Synchronizers are not new in the art and vary considerably in size, function and complexity. Three basic levels of complexity exist in the synchronizer prior art. The most fundamental synchronizer monitors one or more sets of electrical output parameters and provides, by means of an electrical or visual output signal, a compartive indication of the measured parameters. An example of this synchronizer class is the simple voltage comparator. A second, more complex, class of synchronizers include basic phase, frequency and voltage comparators connected as inputs to visual display or to intelligence means for indicating or for effecting a connection of the oncoming generator to the bus lines when all three sets of parameters are simultaneously substantially matched. The well known synchroscope is typical of a synchromatcher within this class. The third, and most complex, class of synchronizers monitor the respective oncoming generator and bus source phase, freqeuncy and voltage parameters and automatically effect changes in the oncoming generator output signal parameters until they are substantially matched with those of the bus source, and thereafter connect the oncoming generator in parallel with the respective bus lines in a timely manner. Our invention is included within the third abovementioned synchronizer class.

Prior art synchronizers have typically used pure analog or quasi-analog techniques for determining phase and frequency matching between the oncoming generator and bus output signals. Early automatic synchronizers employed static sensing means, using transformers to sense corresponding phases of the oncoming generator and bus output signals and beat the respective sensed voltages against one another to provide a signal having a beat frequency that was representative of the phase angle difference and the slip frequency between the oncoming generator and bus source signals. The beat signal was also used to initiate an energizing signal to a circuit breaker for connecting the oncoming generator to the bus source lines. This early prior art technique required bulky electromechanical hardware, was relatively inaccurate and did not anticipate the inherent delay associated with the physcial closing time of the circuit breaker.

Later prior art synchronizers having phase and frequency detectors, compensated for the circuit breaker delay time by providing an energization signal to the circuit breaker prior to actual phase and frequency synchronization between the oncoming generator and bus output signals, thereby establishing phase and frequency synchronization zones. These synchronizers, however, continued to employ analog methods for comparing the oncoming generator and bus source signals. One system, typical of the prior art, determined phase and frequency synchronization by performing analog detection measurements between square wave signal representations of the oncoming generator and bus source otuput signals with a phase angle difference signal produced from the oncoming generator and bus source signal. This system, while considerably improved over early prior art apparatus, requires accurate and complicated circuitry to derive and to compare the analog signals.

Similarly, speed matching apparatus used in early prior art synchronizers employed the aforementioned static sensing techniques using two beat frequency wave forms and frequency to voltage converters for determining whether the oncoming generator output signal frequency was slower or faster than that of the bus source output signal. Apparatus of this type requires filters having long time constants with associated complex circuitry and is generally quite bulky. Later prior art apparatus significantly reduced the size and complexity of the speed matching networks by employing digital techniques. One such speed matching apparatus employed a cross-sampling technique, whereby a square wave sampling pulse signal, derived from the bus source output signal, sampled the oncoming generator output signal while a square wave sampling pulse signal, derived from the oncoming generator output signal, sampled the bus source output signal. The two comparatively produced sampled signals were applied as inputs to a bistable circuit. An analog phase angle difference signal produced from the oncoming generator and bus source signals was thereafter employed to select the appropriate output of the bistable circuit for producing output signals to raise or lower the spped of the oncoming generator. Another embodiment of this prior art apparatus, eliminated the analog phase angle difference signal, but required a phase shift of the bus source signal before its raise or lower output signal could be generated.

Voltage detection and matching functions used in prior art synchronizers typically employ two or more full-wave rectifiers to obtain DC signal representations of the oncoming generator and bus source output voltage signals and measure the difference of the two DC signals by electromechanical or level detecting circuit means for sensing the direction and magnitude of the voltage difference between the oncoming generator and bus source output signals. One such prior art devices for matching the oncoming generator and bus source voltages includes four full-wave rectifiers, a level detector circuit for providing a pair of such difference signals and a logical output circuit triggered by a timing circuit for providing raised and lower pulse signals to the voltage regulator of the oncoming generator. In addition, the voltage monitoring apparatus for providing the circuit breaker actuating control circuit with an enable or inhibit signal and the voltage matching apparatus for providing adjustment signals to the voltage regulator of the oncoming generator are typically physically separate functions in the prior art. The prior art voltage monitoring and matching apparatus are generally bulky and do not meet the time response requirements for interfacing with an otherwise digital synchronizer system.

While the present invention will be described in conjunction with its use in connecting a three-phase oncoming generator with an established three-phase bus source, it will be understood that the invention is not limited to this use but can be employed for connecting any two AC sources in parallel where it is desired not to disturb the operation of one of the sources. Further, while the present invention uses a particular combination of pulse train signals to perform its digital comparison functions, it will be understood that various alterations may be made in the number and in the particular combinations of the pulse train signals without departing from the spirit or intent of this invention. It will also be understood that variations in the individual pulse widths of the pulse train signals to effect a phase angle designation different from that represented in the preferred embodiment may be made within the scope of this invention.

SUMMARY OF THE INVENTION

The present invention discloses a synchronizer system for connecting an oncoming AC generator in parallel with one or more AC generating sources connected in parallel to a common set of bus source lines when the phase, frequency and voltage parameters of the oncoming generator are within predetermined synchronization limits of those of the bus lines and for changing the voltage and rotational speed of the oncoming generator until the oncoming generator parameters synchronize with those of the bus lines. The phase and frequency and monitoring functions, the speed matching function and the production of the synchronizer output control signal are performed by novel digital techniques. The voltage monotiring and matching functions are integrally combined within novel analog circuitry that is both accurate and time responsive to the digital synchronizer requirements.

Miniaturized transformers are connected to corresponding signal lines of the bus source (hereinafter referred to as "bus") and the oncoming generator (hereinafter referred to as "generator") and provide sensed bus and generator output signals respectively therefrom. The sensed bus and generator signals are applied respectively to bus and generator pulse generating circuits and to the inputs of a voltage matching circuit. The bus and generator pulse generator circuits respectively produce a plurality of bus and generator output pulse train signals having pulse repetition rates equal respectively to the frequencies of the sensed bus and generator signals. The pulse widths within any given pulse train signal are constant and individually represent a predetermined number of phase angle degrees for a given base frequency. For example, at a given 60 hertz base frequency, a pulse width of 0.0463 milliseconds represents a one degree phase angle as derived from the following equation:

$$[1/60] \ [\text{sec/hz}] \times [1/360] \ [\text{hz/deg}] = 0.0463 \ [\text{msec/deg}]$$

where:
hz = hertz
sec = second
deg = degree
msec = milliseconds.

Precise phase and frequency synchronization measurements between the bus and generator output signals are made by digitially measuring the time coincidence of pulses from various combinations of the plurality of bus and generator pulse grain signals.

Phase angle synchronization measurements between the bus and generator output signals are performed by digitally detecting time coincidence of pulses from bus and generator phase angle pulse train signals. The bus and generator phase angle pulse train signals each are comprised of pulses whose leading edges are time coincident with the zero angle crossing point of the respective bus and generator sensed signals from which they were derived, and having widths equal to a number of phase angle degrees representing a predetermined phase angle synchronization zone. A logical phase angle enabling signal is produced when phase angle synchronization (pulse coincidence) is detected.

Frequency synchronization measurements are also digitally performed. Frequency angle bus and generator pulse train signals are comprised of individual pulses whose widths and location, with respect to the zero angle reference crossing point of the bus and generator sensed wave forms form which they were respectively derived, define a pair of slip angle zones. The pair of slip angle zones straddle, with respect to phase angle location, and are adjacent to in time, (one on either side of) a predetermined acceptable phase angle synchronization zone. Zero angle bus and generator marker pulse train signals are logically compared respectively with the generator and bus frequency angle pulse train signals. The length of real time coincidence respectively between individual bus and generator zero angle marker pulses and individual pulses from the generator and bus frequency angle pulse train defining the slip angle zones is compared against a preset time interval. If the coincidence duration is less than the preset time interval, the slip frequency between the bus and generator output signals is too high for synchronization; if the coincidence duration is greater than the preset time interval, the relative slip frequency is within the acceptable frequency synchronization limits and a logical frequency enable output signal is produced.

A digital speed matching circuit provides pulsed output signals to raise or lower speed control relays of a governor motor of the oncoming generator for matching the generator output signal frequency to the bus line output signal frequency. Pulse train signals from the bus and generator pulse generating circuits, indicative respectively of the bus and generator output signal frequencies, drive a pair of digital high and low frequency sensing circuits. Following phase coincidence between pulses of the bus and generator pulse train input signals for any given slip frequency cycle between the bus and generator output signals, the pulse train signal representing the higher frequency source produces the first pulse during the next slip frequency cycle. This pulse enables the high or low frequency sensing circuit which activates a latching drive network for the raise or lower speed control relays.

The sensed bus and generator output signals also drive the inputs of a voltage matching circuit. The sensed bus and generator voltage signals are converted respectively into bus and generator current analog signals. A range control circuit adds a predetermined voltage increment, representing the allowable synchronization range, to the bus or generator current analog signal having the largest voltage magnitude. A pair of voltage comparators compare the bus and generator current analog signals with the incremented signal and provide energizing signals to either a raise or lower voltage relay in response thereto. The energized relay provides a control signal to a voltage regulator of the oncoming generator until the oncoming generator output voltage is within the predetermined voltage synchronization range of the bus voltage. When the oncoming generator voltage is within the predetermined voltage synchronization range, the voltage matching relay energizing output signals are discontinued and an in-range detector produces a logical voltage synchronization enabling output signal.

A synchronizer control logic circuit provides an output pulse signal to a circuit breaker for connecting the oncoming generator in parallel with the bus lines when it simultaneously receives the phase, frequency and voltage synchronization enabling logic output signals. Since the slip timing frequency measurement made during the slip angle timing zone occurs in real time prior to the actual phase angle synchronization between the bus and generator signals, the synchronizer control logic pulse signal to the circuit breaker occurs at a time prior to the zero degree phase angle synchronization as determined by the width of the phase angle synchronization zone. The presynchronization signal to the circuit breaker compensates for the physical circuit breaker closing time.

A lockout logic circuit provides a feedback lockout signal from the output of the synchronizer control logic circuit to its input. The lockout signal enables the synchronizer control logic circuit to produce the aforementioned circuit breaker energizing signal, but disables the synchronizer control logic circuit once an output energizing pulse has been provided to the circuit breaker.

It is one object of the present invention, therefore, to provide an improved automatic synchronizer system for connecting two AC sources in parallel.

It is a further object of the present invention to provide an improved automatic synchronizer system for connecting an oncoming generator in parallel with energized AC bus source lines when the phase, frequency and voltage of the bus and generator output signals are within predetermined synchronization limits of each other and for changing the voltage and speed of the oncoming generator to cause its parameters to approach those of the energized bus lines.

It is a further object of the present invention to provide an improved automatic synchronizer system of the aforementioned type wherein the phase and frequency measurements and the synchronization control functions are performed completely by digital means.

It is another object of the present invention to provide an improved automatic synchronizing system of the aforementioned type wherein the speed matching function utilizes improved true digital means to provide raise and lower signals to a speed regulating motor of the oncoming generator.

It is a further object of the present invention to provide an improved automatic synchronizing system as described above, wherein the speed matching function utilizes novel analog circuitry that is time responsive to the digital speed requirements of the synchronizing system to provide continuous output signals for changing the oncoming generator output voltage until it is within a predetermined voltage synchronization range of the bus souce output voltage.

These and other objects of my invention will become apparent to those skilled in the art upon consideration of the accompanying specification, claims and drawings.

BRIEF DESCRIPTION OF THE DRAWINGS

FIG. 2 is a diagrammatic block representation of the bus pulse generator circuits of the present invention disclosed in FIG. 1.

FIG. 3 is a diagrammatic block representation of the oncoming generator pulse generator circuits of the present invention disclosed in FIG. 1.

FIG. 4 is a schematic representation exemplifying a wave-shaped network as disclosed in FIGS. 2 and 3.

FIG. 5 is a schematic representation exemplifying a pulse generator circuit as disclosed in FIGS. 2 and 3.

FIG. 8 is a schematic representation exemplifying a simple latch circuit of the present invention as disclosed in FIGS. 6 and 7.

FIG. 9 is a schematic representation exemplifying a high or low frequency sensor circuit of the present invention as disclosed in FIG. 7.

FIG. 10 is a graphical representation illustrating the relative timing between the bus and generator sensed voltage signals and the bus and generator pulse train signals derived therefrom.

DESCRIPTION OF THE PREFERRED EMBODIMENT

Figure 1:
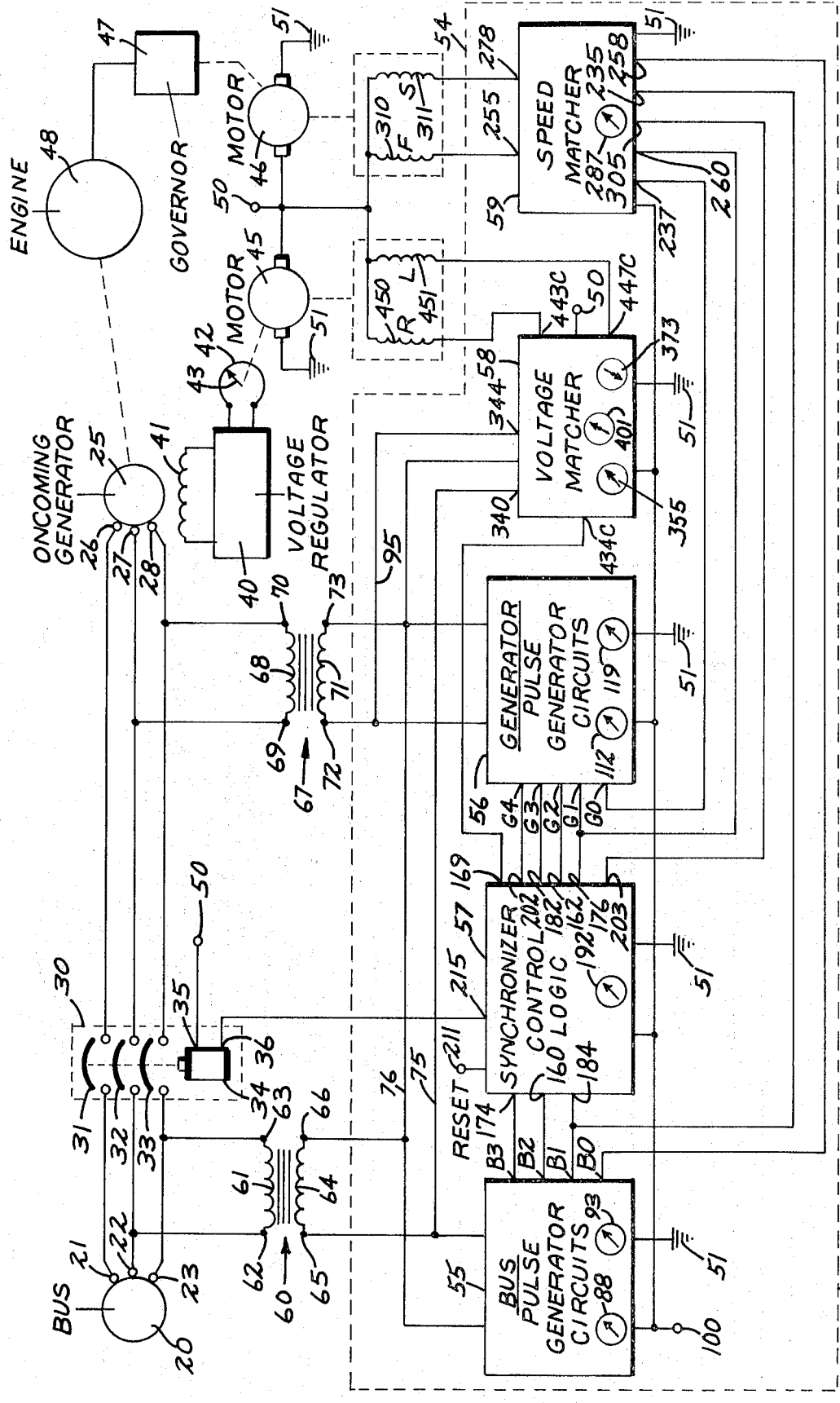
FIG. 1 is a diagrammatic block representation of the automatic sychronizer system of the present invention.

Referring to FIG. 1, there is generally shown a bus source 20 representing one or a plurality of AC generating sources (not shown) connected in parallel to a set of multiple phase bus output lines designated 21, 22 and 23. An oncoming AC generator 25 has a set of multiple phase generator output lines 26, 27 and 28. A multiple contact circuit breaker 30, has a set of normally open movable contacts 31, 32 and 33 which, when in a closed position, are operable to connect respectively the bus output lines 21, 22 and 23 to the generator lines 26, 27 and 28. The circuit breaker 30 further has an energizing coil 32 that holds the movable contacts 31, 32 and 33 in a normally open position. The energizing coil 34 of circuit breaker 30 has a first terminal 35 directly connected to a voltage supply 50 and also has a second terminal 36. A voltage regulator 40 has a field winding 41 connected for regulating the output voltage of the oncoming generator 25. The voltage regulator 40 further has a potentiometer 42 having a movable wiper arm 43 whose movement is controlled by a DC potentiometer controlling motor 45. The potentiometer controlling motor 45 is energized through connections to the voltage supply 50 and to a common 51.

A DC speed controlling motor 46 is connected to control a governor 47 of a prime mover engine 48. The prime mover engine 48 is connected to an armature (not shown) of the oncoming generator 25, thereby controlling the rotational speed of the oncoming generator 25. The speed controlling motor 46 is energized through connections to the voltage supply 50 and to the common 51.

The major circuit functions of one embodiment of an automatic synchronizing system of the present invention, generally designated as 54 in FIG. 1, include a plurality of bus pulse generator circuits 55, a plurality of oncoming generator pulse generator circuits 56, a synchronizer control logic circuit 57, a voltage matcher circuit 58 and a speed matcher circuit 59.

Inputs to the automatic synchronizing system 54 are provided by a bus voltage ssensing transforemr 60 and a generator voltage sensing transformer 67. IN the preferred embodiment, the bus and generator voltage sensing transformers 60 and 67 are miniaturized sensing transformers. The bus voltage sensing transformer 60 has a primary winding 61 having first and second terminals 62 and 63, respectively, connected to the bus output lines 22 and 23. The generator voltage sensing transformer 67 has a primary input winding 68 having first and second terminals 69 and 70, respectively, connected to the generator output lines 27 and 28. The bus and generator primary transformer windings 61 and 68 may respectively be connected between any two corresponding bus and generator output lines. The bus and generator sensing transformers 60 and 67 further have respectively secondary windings 64 and 71.

The bus sensing transformer secondary winding 64 has a first terminal 65 connected to a bus input conductor 75. The secondary winding 64 further has a second terminal 66 connected to a reference input conductor 76. The bus and reference input conductors 75 and 76, respectively, are connected as inputs to the bus pulse generator circuits 55 and are directly connected as the inputs to a bus wave-shaper network 77, see FIG. 2. The bus wave-shaper network 77 further has a supply input directly connected to a supply voltage 100, a reference input directly connected to the common 51 and a signal output 78. The signal output 78 of the wave-shaper 77 is directly connected to an input 79 of a B0 bus pulse generator circuit 80, to an input 82 of a B1 bus pulse generator circuit 83 and to an input 85 of a B2 bus pulse generator circuit 86. The B0 and the B1 bus pulse generator circuits 80 and 83, respectively, have supply inputs directly connected to the supply voltage 100 and also have reference inputs directly connected to the common 51. The B0 and B1 bus pulse generator circuits 80 and 83, respectively, further have signal outputs 81 and 84. The B2 bus pulse generator circuit 86 also has a reference input directly connected to the common 51 and a supply input 87 connected by means of a variable resistor 88 to the supply voltage 100. The B2 bus pulse generator 86 further has a signal output 89 connected by means of an inverter 96 to an input 90 of a B3 bus pulse generator 91. The inverter 96 further has a reference input directly connected to the common 51 and a supply input connected to the positive supply 100. The B3 bus pulse generator 91 also has a reference input directly connected to the common 51, a supply input 92 connected by means of a variable resistor 93 to the positive supply 100 and further has a signal output 94. The variable resistors 88 and 93 can be physically adjusted as illustrated by the adjustment control symbol of like number in FIG. 1.

The secondary winding 71 of the generator voltage sensing transformer 67 has a first terminal 72 connected to a generator input conductor 95. The secondary winding 71 further has a second terminal 73 connected to the reference input conductor 76. The generator input conductor 95 and the reference input conductor 76 from inputs to the oncoming generator pulse generator circuits 56, and are directly connected as inputs to a generator wave-shaping network 97, see FIG. 3. The generator wave-shaping network 97 further has a supply input directly connected to the supply voltage 100, a reference input directly connected to the common 51 and a signal output 98. The signal output 98 of the wave shaper 97 is directly connected to an input 103 of a G0 pulse generator circuit 104, to an input 106 of a G1 pulse generator circuit 107, to an input 109 of a G2 pulse generator circuit 110 and to an input 114 of an inverter logic gate 115. The G0 and G1 pulse generator circuits 104 and 107, respectively, have reference inputs directly connected to the common 51 and also have supply inputs directly connected to the supply voltage 100. The G0 and G1 pulse generator networks 104 and 107, respectively, further habe signal outputs 105 and 108. The G2 pulse generator 110 has a reference input directly connected to the common 51 and a supply input 111 connected by means of a variable resistor 112 to the supply voltage 100. The G2 pulse generator 110 further has a signal output 113 connected by means of an inverter 99 to an input 116 of a G3 pulse generator circuit 117. The inverter 99 further has a reference input connected to the common 51 and a supply input connected to the positive supply 100. The G3 pulse generator circuit 117 has a reference input directly connected to the common 51, a supply input 118 connected by means of a variable resitor 119 to the supply voltage 100 and further has a signal output 120. The inverter 115 has a reference input directly connected to the common 51, a supply input directly connected to the supply voltage 100 and a signal output 121 directly connected to an input 122 of a G4 pulse generator circuit 123. The G4 pulse generator circuit 123 also has a reference input directly connected to the common 51, a supply input directly connected to the supply voltage 100 and a signal output 124. The variable resistors 112 and 119 can be physically adjusted as illustrated by the adjustment control symbol of like number in FIG. 1.

To aid in later reference, the signal outputs 81, 84 89 and 94 if the bus pulse generator circuits 55 have been respectively labeled as B0, B1, B2 and B3 and will be used synonomously with the aforementioned numerical designations. Similarly, the signal outputs 105, 108, 113, 120 and 124 of the generator pulse generator circuits 56 have been respectively labeled as G0, G1, G3 and G4 and will be coterminously used with their representative numerical designations.

A typical wave shaper network 126 for separately implementing the bus and generator wave shaper networks 77 and 97, respectively, is illustrated in FIG. 4. An input 127 of the wave shaper 126 is connected by means of a resistor 130 to an input 131 of an inverter gate 132. The input 127 of the wave shaper 126 is synonomous, in FIGS. 2 and 3, respectively, to the bus or generator input conductors 75 or 95. The input 131 of inverter 132 is further connected by means of a zener diode 133 and by means of a capacitor 134 to a common wave shaper input 128. The common input 128 is synonomous with the conductor 76 in FIGS. 2 and 3, and is also directly connected to the common 51, thereby forming the common terminal to the wave shaper network. The inverter 132 further has a supply input 135 directly connected to the positive supply 100, a reference input 136 directly connected to common 51 and an output 137 connected by means of a capacitor 138 to the common 51. The output 137 of the inverter 132 also forms the output of the wave shaper 126 and is synonomous with the wave shaper outputs 78 and 98, respectively, in FIGS. 2 and 3.

For the sake of brevity and ease in description of the drawings, the transistors hereinafter referenced will be described by a single number with the individual transistor terminals being referenced according to their functional names as follows: base (b), collector (c) and emitter (e).

An example of a pulse generator network 140 typically employed to implement the pulse generator networks of FIGS. 2 and 3 and all other pulse generator circuits of this invention hereinafter disclosed is illustrated in FIG. 5. For the sake of brevity, input and output terminal designation cross references will not be made between the typical pulse generator 140 and the individual pulse generators in FIGS. 2 and 3, it being understood that all of the pulse generator networks in FIGS. 2 and 3 are structured like the typical pulse generator 140. An input 141 to the pulse generator 140 also forms an input to a first inverter 142. The inverter 142 further has a supply input 143 directly connected to the positive supply 100, a reference input 144 directly connected to the common 51 and a signal output 145. The output 145 of inverter 142 is connected by means of a capacitor 146 to an input 147 of a second inverter 148. The input 147 of the inverter 148 is connected by means of resistor 149 to the common 51, and may be also connected by means of a resistor 150 to the positive supply 100. The inverters 142 and 148 may be of the standard diode transistor logic (DTL) construction, a basic example of which is illustrated by the schematic representation of the inverter 148. The input 147 of inverter 148 is connected by means of a back biased diode 151 to a base (b) of an NPN transistor 153. The transistor 153 further has an emitter (e) directly connected to the common 51 and also has a collector (c) connected by means of a resistor 156 to the positive supply 100. The collector (c) of transistor 153 is also connected as an output 154 of the pulse generator network. The base (b) of transistor 153 is also connected by means of a resistor 152 to the positive supply 100.

Figure 6:
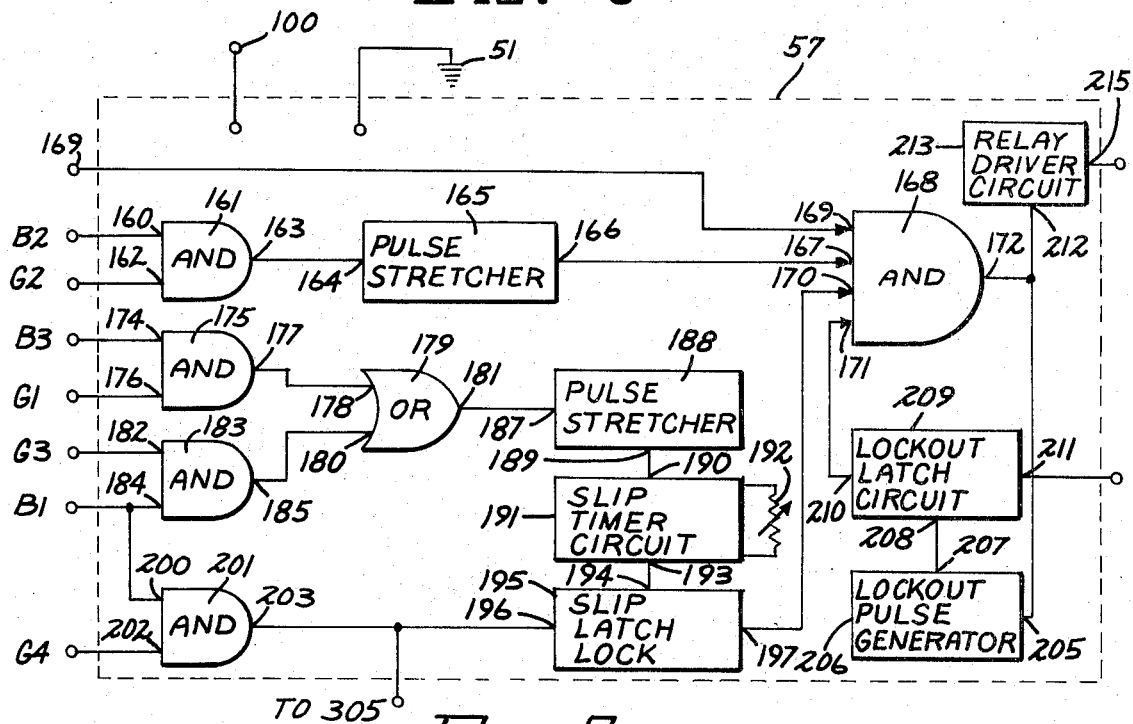
FIG. 6 is a diagrammatic block representation of the synchronizer control logic circuit of the present invention as disclosed in FIG. 1.

Referring to FIG. 1, a plurality of outputs from the bus and generator pulse generator circuits 55 and 56, respectively, are generally connected as inputs to the synchronizer control logic circuit 57. The synchronizer control logic circuit 57 is schematically illustrated in FIG. 6. Referring, therefore, to FIGS. 1 and 6, the signal output B2 of the bus pulse generator circuits 55 is directly connected to an input 160 of a first AND gate 161. The AND gate 161 further has a second input 162 directly connected to the signal output G1 of the generator pulse generator circuits 56. The AND gate 161 further has a signal output 163 directly connected to an input 164 of a pulse stretcher network 165. The pulse stretcher network 165 further has a signal output 166 directly connected to a first input 167 of a synchronizer control AND gate 168. The AND gate 168 further has a second input 169, a third input 170, a fourth input 171 and a signal output 172.

The signal output B3 of the bus pulse generator circuits 55 is directly connected to a first input 174 of a second AND gate 175. AND gate 175 further has a second input 176 directly connected to the signal output G1 of the generator pulse generator circuits 56. The AND gate 175 further has a signal output 177 directly connected to a first input 178 of a logical OR gate 179. The OR gate 179 further has a second input 180 and an output 181. The signal output G3 of the generator pulse generator circuits 56 is directly connected to a first input 182 of a third AND gate 183. The AND gate 183 further has a second input 184 directly connected to the signal output B1 of the bus pulse generator circuits 55. The AND gate 183 also has a signal output 185 directly connected to the second input 180 of the OR gate 179.

The output 181 of the OR gate 179 is directly connected to an input 187 of a pulse stretcher network 188. The pulse stretcher 188 further has a signal output 189 directly connected to an input 190 of a slip timing circuit 191. A variable resistor 192 is connected to the slip timing circuit 191 for manual adjustment of the slip timing circuit. The variable resistor 192 is also represented by the adjustment control symbol of like number in the synchronizer control logic circuit 57 in FIG. 1. The slip timing circuit 191 also has output 193 directly connected to a first input 194 of a slip latch locking circuit 195. The slip latch locking circuit 195 further has a second input 196 and also has a signal output 197 directly connected to the third input 170 of the control AND gate 168.

The signal output B1 of the bus pulse generator circuits 55 is also directly connected to a first input 200 of a fourth AND gate 201. The AND gate 201 further has a second input 202 directly connected to the signal output G4 of the generator pulse generator circuits 56. The AND gate 201 also has a signal output 203 directly connected to the second input 196 of the slip latch locking circuit 195.

The output 172 of the synchronizer control AND gate 168 is directly connected to an input 205 of a lockout pulse generator circuit 206. The pulse generator circuit 206 further has a signal output 207 directly connected to an input 208 of a lockout latching circuit 209. The lockout pulse generator circuit 206 may be any standard pulse generator circuit, an example of which has been illustrated in FIG. 5. The lockout latching circuit 209 also has a reset input 211 and also has an output 210 directly connected to the fourth input 171 of the AND gate 168. The output 172 of AND gate 168 is also directly connected to an input 212 of a relay driver circuit 213. The relay driver 213 also has a signal output 215 forming the signal output of the synchronizer control logic circuit 57 and also directly connected to the second terminal 36 of the circuit breaker energizing coil 34, see FIG. 1.

Although not individually illustrated in FIG. 6, the positive supply 100 and the common 51 are connected to bias each of the logic elements of the synchronizer control logic circuit 63 other than the relay driver circuit 213, which is biased by the voltage supply 50 by means of the circuit breaker energizing coil 34.

The pulse stretcher circuits 165 and 188 and all pulse stretcher circuits of this invention hereinafter disclosed may be comprised of any standard logic circuit or combination thereof whose functional effect is to receive an input pulse and to produce therefrom an expanded (stretched) output pulse.

The slip timing circuit 191 and all timing circuits of this invention hereinafter disclosed may be comprised of any digital or analog timing circuit whose timing cycle is initiated by an input pulse and (whose function is to) produce a timeout signal after a predetermined timing period. As indicated by the variable resistor 192, the timer circuit should also have a means of adjusting the length of the timing period. Typical of a digital timing circuit is a standard counting (up or down) circuit; typical of an analog timer is the standard capacitor discharged unijunction timing circuit.

The slip latch locking circuit 195 and the lockout latching circuit 209, and all latch circuits of this invention hereinafter described, may be comprised of any standard logic circuits or combinations thereof that perform a digital latching function upon the receipt of an input latching signal. The slip latch locking circuit 195 and the lockout latching circuit 209 represent dual input latching circuits, where the second input for the lockout latching circuit 209 is represented by the reset input 211. A typical example of such a latching circuit is illustrated in FIG. 8.

It should also be noted that the logical gates represented throughout this description refer to general logical functions and may be physically implemented either by positive or negative logic gates.

A typical latching circuit 219 applicable for implementation of the slip latch locking circuit 195, the lockout latching circuit 209 and for other latching circuits to be hereinafter described is illustrated in FIG. 8. A first latch input 220 is directly connected to a first input 221 of a first NAND gate 222. The NAND gate 222 further has a second input 223 and an output 224. The output 224 of the NAND gate 222 is directly connected to a first input 225 of a second NAND gate 226. The NAND gate 226 further has a second input 227 also forming the second latch circuit input. The NAND gate 226 also has a single output 228 that is directly connected to the second input 223 of the NAND gate 222. The output 228 of NAND gate 226 also comprises the signal output of the latch circuit. Although a pair of NAND gates were used in the typical latch circuit of FIG. 8, it is obvious that any logical elements which perform a logical signal latching function may be employed without departing from the spirit or intent of this invention.

Figure 7:
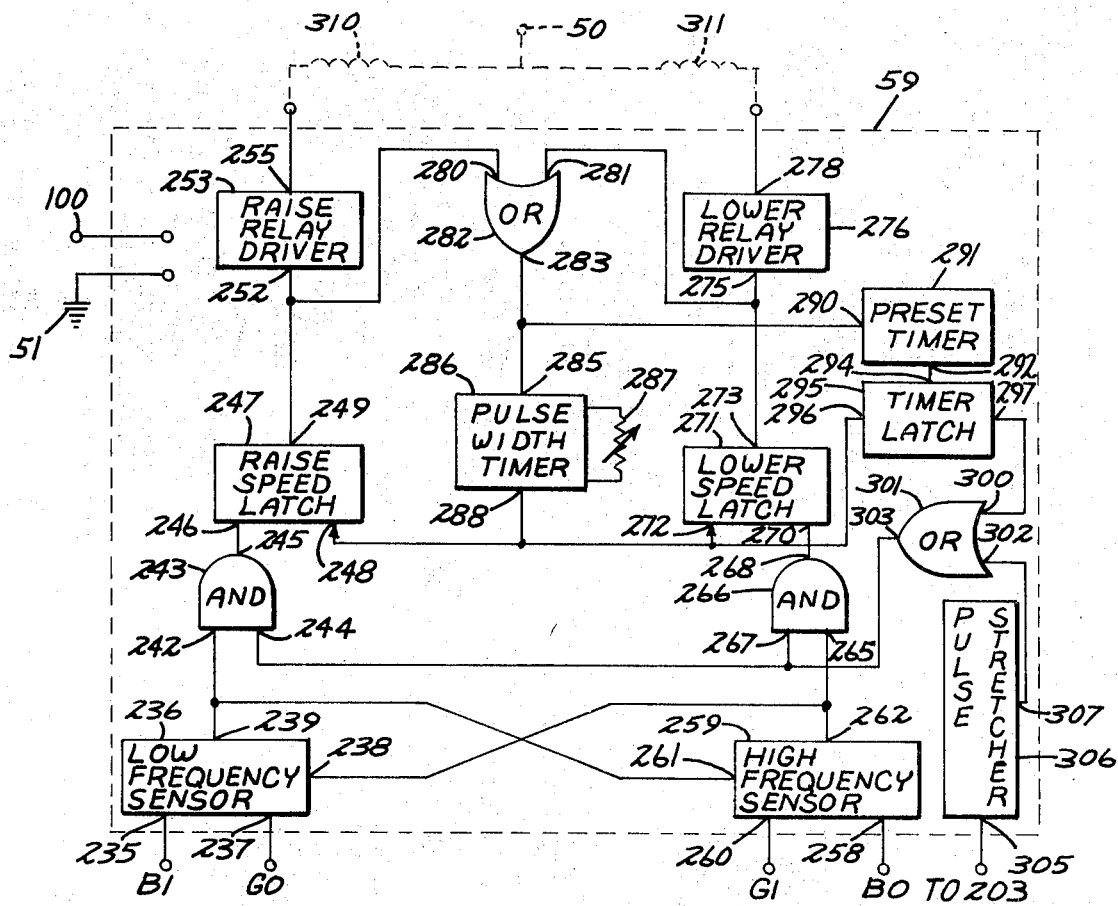
FIG. 7 is a diagrammatic block representation of the speed matcher circuit of the present invention as disclosed in FIG. 1.

The speed matcher circuit 59 (FIG. 1) is illustrated in block diagram form in FIG. 7. Connections to and within the speed matcher circuit 59 are made with reference to FIG. 1 and FIG. 7 and appropriate additional drawing references as hereinafter noted. The B1 signal output of the B1 bus pulse generator circuit 83 (FIG. 2) is directly connected to a first input 235 of a low frequency sensor circuit 236 of the speed matching circuit 59. The low frequency sensor 236 also has a second input 237 directly connected to the G0 signal output of the G0 pulse generator circuit 104 (FIG. 3). The low frequency sensor 236 also has a latch input 238 and a signal output 239 that is directly connected to a first input 242 of an AND gate 243. The AND gate 243 also has a second input 244 and an output 245. The output 245 of the AND gate 243 is directly connected to a first input 246 of a raise speed latching circuit 247. The raise speed latching circuit 247 also has a triggering input 248 and a signal output 249. The output 249 of the raise speed latching circuit 247 is directly connected to an input 252 of a "raise" relay driver circuit 253. The raise delay driver circuit 253 further has a signal output 255 also forming an output of the speed matcher circuit 59.

The B0 signal output of the B0 bus pulse generator circuit 80 (FIG. 2) is directly connected to a first input 258 of a high frequency sensor circuit 259. The high frequency sensor circuit 259 further has a second input 260 directly connected to the G1 signal output of the G1 pulse generator circuit 107 (FIG. 3). The high frequency sensor circuit 259 further has a latch input 261 directly connected to the signal output 239 of the low frequency sensor circuit 236, and also has a signal output 262 directly connected to the latch input 238 of the low frequency sensor circuit 236. The output 262 of the high frequency sensor 259 is also directly connected to a first input 265 of an AND gate 266. The AND gate 266 also has a second input 267 directly connected to the second input 244 of the AND gate 243. The AND gate 266 also has an output 268 directly connected to a first input 270 of a lower speed latching circuit 271. The lower speed latching circuit 271 also has a triggering input 272 directly connected to the triggering input 248 of the raise speed latching circuit 247. The lower speed latching circuit 271 also has a signal output 273 directly connected to an input 275 of a "lower" relay driving circuit 276. The relay driver circuit 276 further has a signal output 278 also forming an output of the speed matcher circuit 59.

The output 249 of the raise speed latching circuit 247 and the output 273 of the lower speed latching speed circuit 271 are respectively connected to a first input 280 and to a second input 281 of a logical OR gate 282. The OR gate 282 further has an output 283 directly connected to an input 285 of a pulse width timer circuit 286. A variable resistor 287 is connected to the pulse width timer circuit 286 for manual adjustment of the timing function of the pulse width timer circuit 286. The variable resistor 287 is also illustrated by the adjustment control symbol of like number in FIG. 1. The pulse width timer 286 also has a signal output 288 directly connected to the triggering inputs 248 and 272 of the raise and lower speed latching circuits 247 and 271, respectively.

The output 283 of the OR gate 282 is further directly connected to a triggering input 290 of a preset timer circuit 291. The preset timer circuit 291 also has a signal output 292 directly connected to a first input 294 of a timer latching circuit 295. The timer latching circuit 295 further has a second input 296 and a signal output 297. The second input 296 of the timer latch circuit 295 is directly connected to the signal output 288 of the pulse width timer circuit 286. The signal output 297 of the timer latch circuit 295 is directly connected to a first input 300 of a logical OR gate 301. The OR gate 301 further has a second input 302 and an output 303. The output 303 of the OR gate 301 is directly connected to the second inputs 244 and 267 of the AND gates 243 and 266, respectively.

The output 203 of the AND gate 201 (FIG. 6) is directly connected to an input 305 (FIG. 7) of a pulse stretcher circuit 306. The pulse stretcher circuit 306 further has a signal output 307 directly connected to the second input 302 of the OR gate 301.

The signal output 255 of the raise relay driver 253 is connected by means of a raise relay coil 310 to the voltage supply 50. The signal output 278 of the lower relay driver circuit 276 is connected by means of a lower relay coil 311 to the voltage supply 50.

Although not shown in FIG. 7, except for the raise and lower relay driver circuits 253 and 276, which receive their bias from the voltage supply 50, each of the logical circuit elements of the speed matching circuits 59 are connected to receive their voltage bias from the supply voltage 100 and are also connected to the common reference 51.

The raise and lower speed latching circuits 247 and 271, respectively, and the timer latch circuit 295 represent typical latching circuits. The simple two NAND gate configuration illustrated in FIG. 8 is typical of such a latching circuit.

The pulse width timer circuit 286 and the preset timer circuit 291 are standard timing circuits and may be either of digital or analog construction as previously discussed.

As previously described, the pulse stretcher circuit 306 may consist of any logical circuits whose function is to stretch an incoming pulse.

The relay driver circuits 253 and 276 are comprised of a transistor amplifier or any standard circuit configuration suitable for energizing a relay coil. The low and high frequency sensing circuits 236 and 259, respectively, are symmetrical, with respect to each other, logical circuits. An example of a frequency sensing circuit 314 using standard NAND gate logic gates is illustrated in FIG. 9. Referring to FIG. 9, a first input 315 of an inverter 316 also forms an input of the frequency sensor 314 and corresponds to inputs 237 and 258 of the low and high frequency sensor circuits 236 and 259, respectively (FIG. 7). The inverter 316 further has an output 317 directly connected to a first input 318 of a first NAND gate 319. The NAND gate 319 also has a second input 320 and an output 321 that is directly connected to first input 322 of a second NAND gate 323. The NAND gate 323 also has a second input 324 and an output 325. The output 325 of the second NAND gate 323 is directly connected to the second input 320 of the first NAND gate 319 and also forms the signal output of the frequency sensor 314 and corresponds to the signal outputs 239 and 262 of the low and high frequency sensor circuits 236 and 259, respectively, of FIG. 7. An input 326 of a third NAND gate 327 also forms a second input to the frequency sensor circuit 314 and corresponds to the inputs 235 and 260 of the low and high frequency sensor circuits 236 and 259, respectively. The third NAND gate 327 further has a second input 328 and an output 329 that is directly connected to the second input 324 of the second NAND gate 323. A latch input 330 corresponding to the latch inputs 238 and 261 of the low and high frequency sensor circuits 236 and 259, respectively, is connected by means of an inverter 331 to the second input 328 of the third NAND gate 327.

Figure 11:
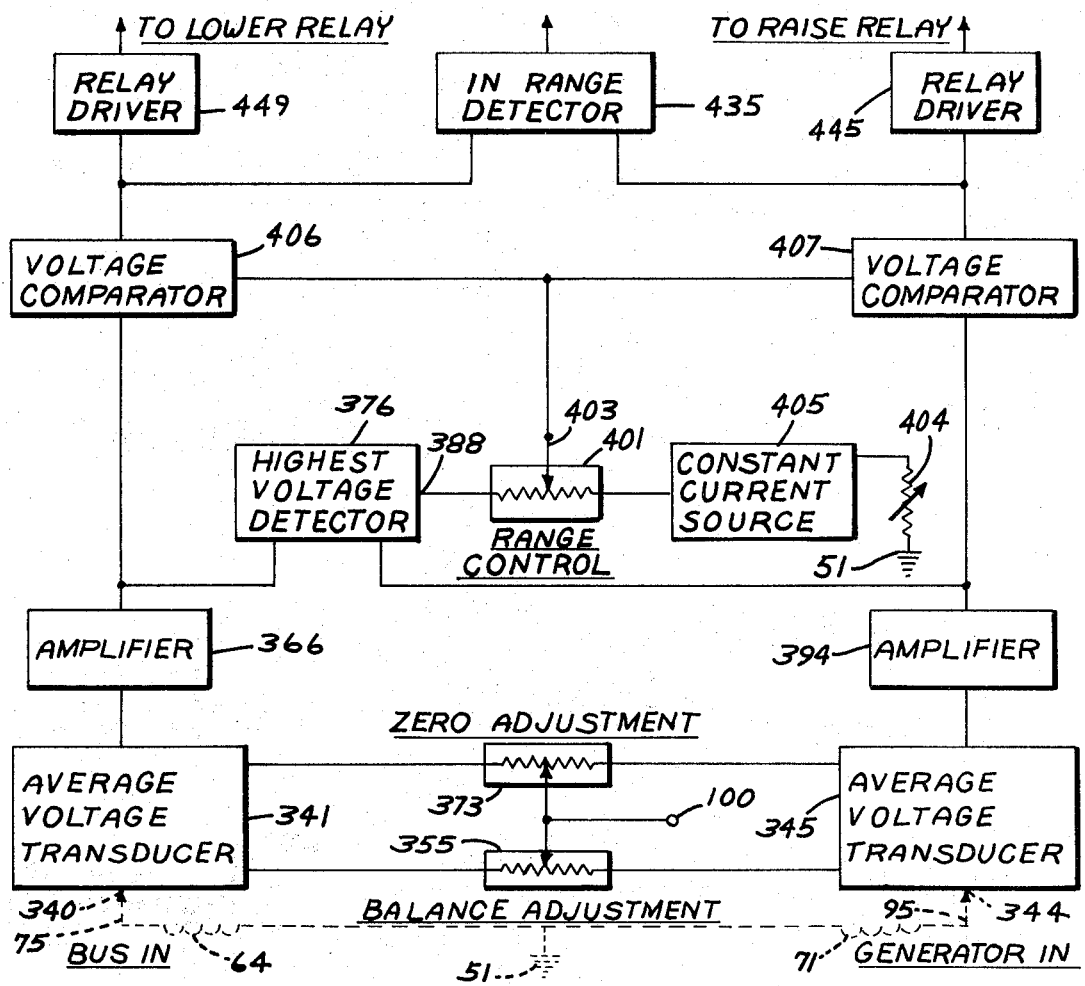
FIG. 11 is a diagrammatic block representation of the voltage matcher circuit of the present invention as disclosed in FIG. 1.
Figure 12:
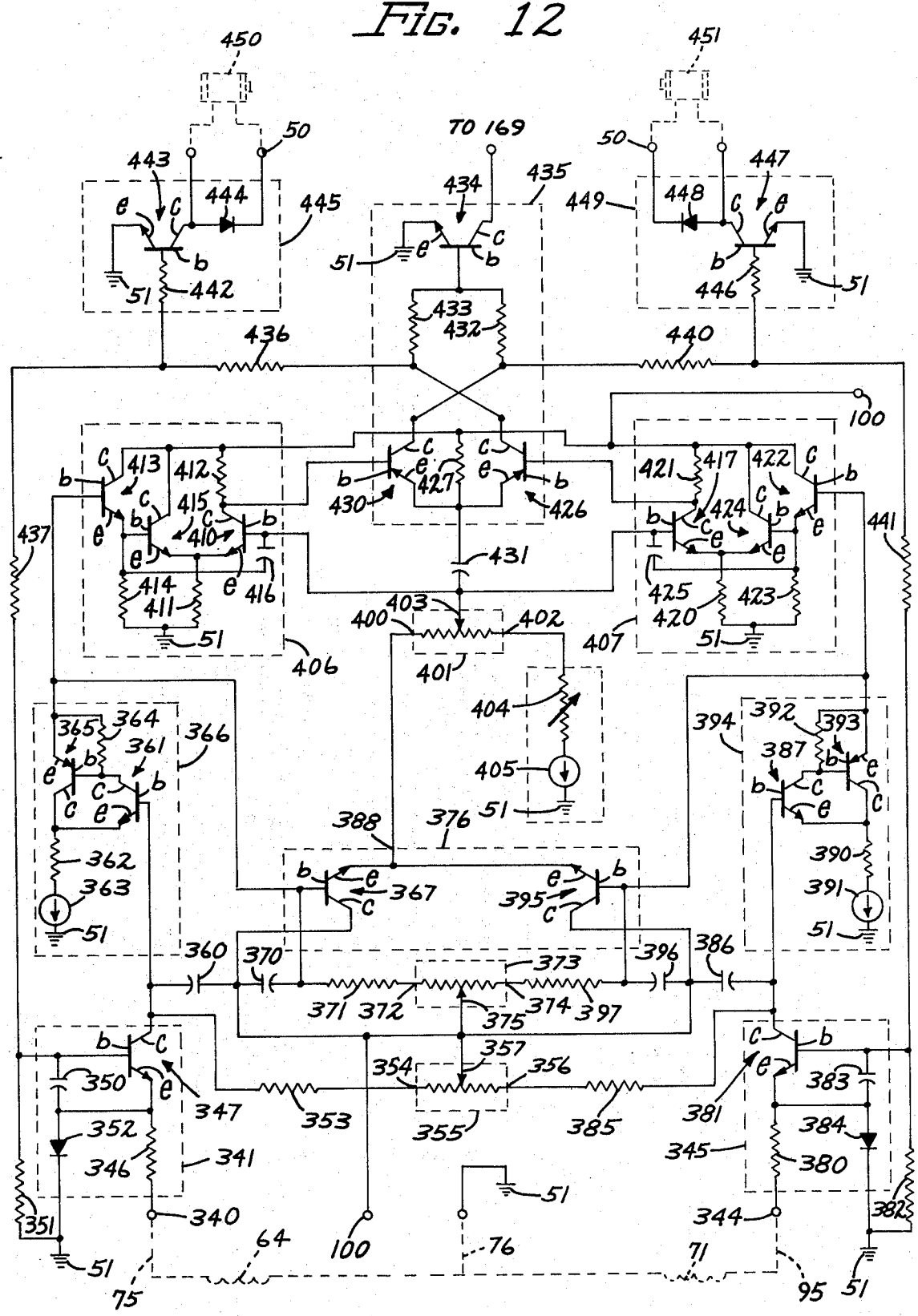
FIG. 12 is a schematic representation of the voltage matcher circuit as disclosed in FIG. 11.

The voltage matcher circuit 58 is shown in block diagram form in FIG. 11 and is schematically illustrated in FIG. 12. Referring to FIGS. 1, 11 and 12, the secondary winding 64 of the bus voltage sensing transformer 60 is connected by means of the bus input conductor 75 to an input 340 of a first average voltage transducer 341 of the voltage matcher circuit 58. A secondary winding 71 of the generator voltage sensing transformer 67 is connected by means of the generator input conductor 95 to an input 344 of a second average voltage transducer 345.

Referring to FIGS. 11 and 12, the input 340 of the first average voltage transducer 341 is connected by means of a resistor 346 to an emitter (e) of an NPN transistor 347. Transistor 347 also has a base (b) and a collector (c). The base (b) and the emitter (e) of the transistor 347 are connected by means of a capacitor 350. The base (b) of transistor 347 is also connected by means of a resistor 351 to the common 51. The emitter (e) of transistor 347 is further connected by means of a diode 352 to the common 51. The collector (c) of transistor 347 is connected by means of a resistor 353 to a first terminal 354 of a balance adjustment potentiometer 355. The potentiometer 355 further has a second terminal 356 and a movable wiper 357 directly connected to the supply voltage 100. The movable wiper 357 of the potentiometer 355 is also connected by means of a capacitor 360 to the collector (c) of the transistor 347. The balance adjustment potentiometer 355 is illustrated by the adjustment control symbol of like number in the voltage matcher circuit 58 in FIG. 1.

The collector (c) of transistor 347 is connected to form the output of the first average voltage transducer 341, and is directly connected to a base (b) of an NPN transistor 361. Transistor 361 further has an emitter (e) and a collector (c). The emitter (e) of transistor 361 is connected by means of a resistor 362 in series with a current source 363 to the common 51. The collector (c) of transistor 361 is connected by means of a resistor 364 to an emitter (e) of a PNP transistor 365. The transistor 365 further has a base (b) directly connected to the collector (c) of transistor 361 and also has a collector (c) directly connected to the emitter (e) of transistor 361. The transistor 365 and 361, the resistors 362 and 364 and the current source 363 comprise the elements of a first amplifier 366. The base (b) of transistor 361 and the emitter (e) of transistor 365 are respectively connected to form the input and output of the first amplifier 366.

The emitter (e) of transistor 365 is directly connected to a base (b) of an NPN transistor 367. Transistor 367 also has an emitter (e) and a collector (c). A collector (c) of transistor 367 is directly connected to the positive potential 100. A capacitor 370 is connected between the base (b) and collector (c) of transistor 367. The base (b) of transistor 367 is also connected by means of a resistor 371 to a first terminal 372 of a zero adjustment potentiometer 373. The zero adjustment potentiometer 373 further has a second terminal 374 and a movable wiper arm 375 that is directly connected to the positive potential 100. The transistor 367 comprises half of a symmetrical high voltage detection circuit 376 having as its first input a connection to the base (b) of transistor 367 and as its output a connection to the emitter (e) of transistor 367. The zero adjustment potentiometer 373 is illustrated by the adjustment control symbol of like number in the voltage matcher circuit 58 in FIG. 1.

The input terminal 344 of the second average voltage transducer 345 is connected by means of a resistor 380 to an emitter (e) of an NPN transistor 381. Transistor 381 further has a base (b) and a collector (c). The base (b) of transistor 381 is connected by means of a resistor 382 to the common 51. A capacitor 383 is connected between the base (b) and the emitter (e) of transistor 381. The emitter (e) of transistor 381 is also connected by means of a diode 384 to the common 51. The collector (c) of transistor 381 is connected by means of a resistor 385 to the second terminal 356 of the balance adjustment potentiometer 355, and is further connected by means of a capacitor 386 to the positive supply 100.

The collector (c) of transistor 381 is directly connected to a base (b) of an NPN transistor 387. Transistor 387 further has an emitter (e) and a collector (c). The emitter (e) of transistor 387 is connected by means of a resistor 390 in series with a current source 391 to the common 51. The collector (c) of transistor 387 is connected by means of a resistor 392 to an emitter (e) of a PNP transistor 393. Transistor 393 further has a base (b) directly connected to the collector (c) of transistor 387 and also has a collector (c) directly connected to the emitter (e) of transistor 387. The transistor 387 and 393, the resistors 390 and 392 and the current source 391 comprise the components of a second amplifier 394. The base (b) of transistor 387 and the emitter (e) of transistor 393 are respectively connected to form the input and the output of the second amplifier 394.

The emitter (e) of transistor 393 is directly connected to a base (b) of an NPN transistor 395. Transistor 395 further has an emitter (e) directly connected to the emitter (e) of transistor 367 and forming jointly therewith an output 388 of the highest voltage detector circuit 376. The transistor 395 also has a collector (c) directly connected to the supply voltage 100. A capacitor 396 is connected between the base (b) and the collector (c) of the transistor 395. The base (b) of transistor 395 is also connected by means of a resistor 397 to the second terminal 374 of the zero adjustment potentiometer 373. The base (b) of transistor 395 is connected to form the second input of the highest voltage detector circuit 376.

The output 388 of the highest voltage detector circuit 376 is directly connected to a first terminal 400 of a range control potentiometer 401. The potentiometer 401 further has a second terminal 402 and a movable wiper 403. The second terminal 402 is connected by means of a variable resistor 404 in series with a current source 405 to the common 51. The movable wiper 403 of the range control potentiometer 401 is connected to form a first input to each of a first voltage comparator 406 and a second voltage comparator 407.

The movable wiper 403 of the range control potentiometer 401 is directly connected to a base (b) of an NPN transistor 410. Transistor 410 further has an emitter (e) connected by means of a resistor 411 to the common 51 and also has a collector (c) connected by means of a resistor 412 to supply voltage 100.

The emitter (e) of transistor 365 is also directly connected to a base (b) of an NPN transistor 413 to form a second input to the first voltage comparator circuit 406. Transistor 413 further has a collector (c) directly connected to the supply voltage 100 and an emitter (e) connected by means of a resistor 414 to the common 51. The emitter (e) of transistor 413 is also directly connected to a base (b) of an NPN transistor 415. Transistor 415 further has a collector (c) directly connected to the supply voltage 100 and an emitter (e) directly connected to the emitter (e) of transistor 410. A capacitor 416 is connected between the base (b) of transistor 410 and the base (b) of transistor 415. The transistors 410, 413 and 415 and their connected peripheral components comprise the elements of the first voltage comparator circuit 406. A connection to the collector (c) of transistor 410 forms the output of the first voltage comparator circuit 406.

With reference to the second voltage comparator 407, the movable wiper 403 of the potentiometer 401 is directly connected to a base (b) of an NPN transistor 417. Transistor 417 further has an emitter (e) connected by means of a resistor 420 to the common 51 and also has a collector (c) connected by means of a resistor 421 to the supply voltage 100.

The emitter (e) of transistor 393 is also directly connected to a base (b) of an NPN transistor 422 to form a second input to the second voltage comparator 407. Transistor 422 further has a collector (c) directly connected to the supply voltage 100 and also has an emitter (e) connected by means of a resistor 423 to the common 51. The emitter (e) of transistor 422 is also directly connected to a base (b) of an NPN transistor 424. Transistor 424 further has a collector (c) directly connected to the supply voltage 100 and also has an emitter (e) directly connected to the emitter (e) of transistor 417. A capacitor 425 connects the base (b) of transistor 417 with the base (b) of transistor 424. The transistors 417, 422 and 424 and their connected peripheral components comprise the elements of the second voltage comparator 407. A connection to the collector (c) of transistor 417 forms the output of the second voltage comparator 407.

The collector (c) of transistor 417 is directly connected to a base (b) of a PNP transistor 426. Transistor 426 further has a collector (c) and also has an emitter (e) connected by means of a resistor 427 to the supply voltage 100.

The collector (c) of transistor 410 is directly connected to a base (b) of a PNP transistor 430. Transistor 430 further has a collector (c) and also has an emitter (e) directly connected to the emitter (e) of transistor 426. The emitter (e) of transistor 430 is also connected by means of a capacitor 431 to the movable wiper 403 of the range control potentiometer 401. The collectors (c) of transistors 430 and 426 are connected respectively by means of a resistor 432 and a resistor 433 to a base (b) of an NPN transistor 434. Transistor 434 further has a collector (c) and also has an emitter (e) that is directly connected to the common 51. The transistors 426, 430 and 434 comprise the elements of an in-range detector 435, having as its inputs connections to the bases (b) of transistors 426 and 430 and having as its output a connection to the collector (c) of transistor 434.

The collector (c) of transistor 434 is directly connected to the second input 169 of the synchronizer control AND gate 168 of the synchronizer control logic circuit 57, see FIG. 1.

The collector (c) of transistor 426 isl also connected by means of a resistor 436 in series with a resistor 437 to the base (b) of the transistor 347. Similarly, the collector (c) of transistor 430 is also connected by means of a resistor 440 in series with a resistor 441 to the base (b) of the transistor 381.

The collector (c) of transistor 426 is also connected by means of the resistor 436 in series with a resistor 442 to a base (b) of an NPN transistor 443. Transistor 443 also has an emitter (e) directly connected to the common 51 and a collector (c) connected by means of a commutating diode 444 to the voltage supply 50. The collector (c) of transistor 443 is also connected by means of a raise relay coil 450 to the voltage supply 50. The transistor 443, the diode 444 and the resistor 442 comprise the elements of a raise relay driver circuit 445 for driving the raise relay coil 450.

The collector (c) of resistor 430 is also connected by means of the resistor 440 in series with a resistor 446 to a base (b) of an NPN transistor 447. Transistor 447 also has an emitter (e) directly connected to the common 51 and further has a collector (c) connected by means of a commutating diode 448 to the voltage supply 50. The collector (c) of transistor 447 is also connected by means of a lower relay coil 451 to the voltage supply 50. The transistor 447, the diode 448 and the resistor 446 comprise the elements of a lower relay driver circuit 449 for energizing the lower relay coil 451.

The simple relay driver circuits 445 and 449 are also typical networks that may be used to implement the relay driver circuits 253, 276 and 213 of the speed matcher circuit 59 and of the synchronizer control logic circuit 57 of FIGS. 7 and 6, respectively.

The zero adjust and balance adjust potentiometers 373 and 355, respectively, provide calibration adjustments to the voltage matcher circuit. The range control potentiometer 401, however, designated by the adjustment control symbol of like number in FIG. 1, is adjustable to vary the voltage synchronization parameter of the voltage matcher 58.

OPERATION OF THE PREFERRED EMBODIMENT

Referring to FIG. 1, a three phase bus source 20 output voltage representing the combined output signals of a plurality of three phase generators connected in parallel, appears on the multiple phase bus output lines 21, 22 and 23. The three phase output voltage of an oncoming generator 25 that is to be connected in parallel with the generating sources comprising the bus source 20, appears on the multiple phase generator output lines 26, 27 and 28. The movable circuit breaker contacts 31, 32 and 33 of the circuit breaker 30, when energized by the energizing coil 34 will connect the bus output lines 21, 22 and 23, respectively, with the oncoming generator output lines 26, 27 and 28.

The primary winding 61 of the bus voltage sensing transformer 60 is connected to sense one phase of the three phase bus source output voltage. Specifically, the bus source output voltage phase that is sensed is that occurring between the bus output lines 22 and 23. Similarly, the primary winding 68 of the oncoming generator voltage sensing transformer 67 senses one phase of the three phase output voltage of the oncoming generator, that occurring between the generator output lines 27 and 28. It is important that the sensing transformers 60 and 67 are respectively connected to sense output voltages across corresponding bus and oncoming generator output lines. That is, after the circuit breaker 30 connects the oncoming generator 25 in parallel with the bus source 20, the primary windings 61 and 68 of the transformers 60 and 67 respectively will be connected in parallel.

The second terminals 66 and 73 of the bus and generator voltage sensing transformer secondary windings 64 and 71, respectively, are connected by means of the reference input conductor 76 to the common reference 51 of the synchronizer system, see FIG. 1 and 12. The first terminals 65 and 72 of the bus and generator transformer primary windings 64 and 61, therefore, carry respectively the bus and oncoming generator sensed output voltage signals.

The bus and generator sensed output voltage signals are applied by means of the bus and the generator input conductors 75 and 95, respectively, to the bus and generator pulse generator circuits 55 and 56, FIGS. 1, 2 and 3. The sensed bus and generator output voltage signals are also directly applied by means of the bus and generator input conductors 75 and 95, respectively, to the inputs 340 and 344 of the voltage matcher circuit 58, FIGS. 1, 11 and 12.

In general, with reference to FIG. 1, the bus pulse generator circuits 55 produce a plurality of bus output pulse train signals (B0 through B3) which are selectively applied as inputs to the synchronizer control logic circuit 57 and to the speed matcher circuit 59. Similarly, the generator pulse generator circuits 56 produce a plurality of generator output pulse train signals (G0 through G4) which are selectively applied as inputs to the synchronizer control logic circuit 57 and to the speed matcher circuit 59. The bus and generator sensed output voltage signals (on the input lines 75 and 95, respectively) and the plurality of bus and generator pulse train signals derived therefrom (B0–B3 and G0–G4 respectively) are the common signal denominators in the synchronizer system upon which all higher order circuit decisions are based.

In general, the voltage matcher circuit 58 directly analyzes the sensed bus and generator output voltage signals and controls the raise and lower relay coils 450 and 451 in response thereto, FIG. 1. The raise and lower relay coils 450 and 451, respectively, control the angular direction in which the armature of the DC potentiometer controlling motor 45 rotates. The DC motor 45 will rotate in one direction when the raise relay 450 is energized, and will rotate in the opposite direction when the lower relay 451 is energized. The DC motor 45 controls the direction in which the wiper arm 43 of the potentiometer 42 moves, thereby increasing or decreasing the effective resistance of the potentiometer 42. The potentiometer 42 regulates current flow through the field winding 41 of the voltage regulator 40, thereby regulating the output voltage of the oncoming generator 25. When the output voltage of the oncoming generator 25 is matched within a predetermined voltage synchronization range to that of the bus source 20, the voltage matcher 58 provides a voltage synchronization output signal at its output 434(c) to the input 169 of the synchronizer control logic circuit 57.

The speed matcher circuit 59, FIG. 1, responds directly to inputs from the bus and generator pulse generator circuits 55 and 56, respectively. The output function of the speed matcher circuit 59 is similar to that of the voltage matcher circuit 58. In general, the outputs 255 and 278 of speed matcher circuit 59 control the raise and lower speed relay coils 310 or 311, respectively, in response to the input bus and generator pulse train signals. The raise and lower speed relays 310 and 311 control the directional rotation of the DC speed controlling motor 46. The DC motor 46 regulates the governor 47 of the prime mover engine 48 of the oncoming generator 25, thereby regulating the speed and the output signal frequency of the oncoming generator 25.

The synchronizer control logic circuit 57, in response to the plurality of bus and generator input pulse train signals (B1-B3 and G1-G4 respectively) and in response to the voltage synchronization signal (input 169) from the speed matcher circuit 59, provides an energizing signal to the circuit breaker coil 34 when the input signals indicate that the phase, frequency and voltage of the oncoming generator 25 are matched within predetermined phase, frequency and voltage synchronization limits to those of the bus source 20. When energized, the coil 34 of the circuit breaker 30 causes the movable circuit breaker contacts 31, 32 and 33 to connect respectively the bus source lines 21, 22 and 23 to the oncoming generator output lines 26, 27 and 28.

FIG. 2 illustrates the bus pulse generator circuits 55. The sensed bus output voltage signal is applied by the bus input conductor 75 to the input of the wave shaper network 77. The sensed bus output signal has a frequency equal to the rotational speed of the generator(s) comprising the bus source 20. The wave shaper network 77 produces at its output 78 a "shaped" square wave representation of the sensed bus output signal as illustrated by the sensed and shaped bus wave form signals, respectively, in FIGS. 10A and 10B.

The operation of the wave shaper 77 can be described with reference to the operation of a typical wave shaping network 126 in FIG. 4. An input signal (the sensed bus voltage) is applied to the input 127 of the wave shaper 126. The input signal is applied by means of the resistor 130 to the input 131 of the inverter 132. The zener diode 133 clips the input signal at a voltage level equal to the zener diode 133 breakdown voltage. Therefore, the signal at the input 131 of the inverter 132 appears as a clipped sine wave. The logical switching function and fast response time of the inverter 132 further shape the clipped sine wave, producing a true square wave signal at the output 137 of the inverter 132 and of the wave shaper 126. The capacitors 134 and 138 provide filtering functions within the wave shaper 126. Note that wave shaping by means of an inverter circuit as above described results in an inverted square wave output signal as illustrated in FIGS. 10A and 10B.

The shaped bus wave form appearing at the output 78 of the wave shaper 77 (FIG. 2) is directly applied to the B0, B1 and B2 pulse generators 80, 83 and 86, respectively. Each of these pulse generators provides an output pulse train signal whose frequency equals that of the shaped bus wave form and whose individual pulse widths are constant for the particular pulse generator output signal and equal a predetermined number of phase angle degrees, depending upon the design constraints of the individual pulse generator. The pulse train signals occurring at the outputs 81, 84 and 89 of the pulse generator circuits 80, 83 and 86, respectively, are designated as B0, B1 and B2 and are illustrated in relation to each other and to the sensed and shaped bus wave forms in FIGS. 10D, 10C and 10E. Referring to FIG. 2, the input 90 of the B3 pulse generator 91 is driven from the inverted B2 pulse train signal from the B2 pulse generator output 89. As a result, the leading edge of the individual pulses of the B3 pulse train signal will correspond in time to the trailing edges of individual pulses of the B2 pulse train signal, as illustrated in FIGS. 10E and 10F.

A typical pulse generator circuit 140 that may be used to implement the pulse generators of the preferred embodiment is illustrated by the use of DTL logic gates in FIG. 5. The leading edge of a positive going square wave signal applied to the input 141 of the inverter 142 appears as a leading edge of a negative going signal at the inverter output 145. The negative going output signal instantaneously appears across the capacitor 146, thereby lowering the voltage at the input 147 of the inverter 148. The lowered voltage at the input 147 causes current to flow from the positive supply 100 in parallel through the resistor 152 and diode 151 and the resistor 150 through the resistor 149 to common 51 thereby charging the capacitor 146. The lowered voltage at the input 147 also drops the voltage at the base (b) of the transistor 153 causing the transistor 153 to operate in its cutoff region, and thereby causing the output 154 of the pulse generator 140 to rise forming a high leading edge of a pulse. The capacitor 146 charges exponentially, thereby raising the voltage at the input 147 of the inverter 148. When the voltage at the base (b) of the transistor 153 is sufficiently forward biased to cause the transistor 153 to saturate, the collector (c) of transistor 153 and also the output 154 of the pulse generator 140 will drop to a low output voltage corresponding to the trailing edge of a pulse. The length of a thus produced output pulse can be accurately determined by varying the time constant established by the capacitor 146 and the resistors 149 and 150. The variable resistor 150 provides the means for adjusting the width of a pulse when tight accuracy is required. Note that the resistor 150 corresponds to the variable resistors 88 and 93 in FIG. 2.

FIG. 3 illustrates the generator pulse generator circuits 56. The sensed generator output voltage signal is applied through the generator input conductor 95 to the input of the wave shaper network 97. The sensed generator output signal has a frequency equal to the rotational speed of the oncoming generator 25. The wave shaper network 97 produces at its output 98 a shaped square wave representation of the sensed generator output signal in a manner similar to that previously described with respect to the bus wave shaper network 77. The sensed and shaped generator signals are illustrated respectively in FIGS. 10G and 10H.

The shaped generator wave form appearing at the output 98 of the wave shaper 97, is directly applied to the G0, G1 and G2 pulse generators 104, 107 and 110, respectively. Each of these pulse generators provides an output pulse train signal whose frequency equals that of the shaped generator wave form and whose individual pulse widths are constant for the particular pulse generator output signal and equal a predetermined number of phase angle degrees. The pulse widths of the pulse train signals depend upon the design constraints of the individual pulse generator; those of the G2 pulse train signal can be varied by adjusting the value of the variable resistor 112. The pulse train signal occurring at the outputs 105, 108 and 113 of the pulse generator circuits 104, 107 and 110, respectively, are designated as G0, G1 and G2 and are illustrated in relation to each other and to the sensed and shaped generator wave forms in FIGS. 10J, 10I and 10K, respectively. Referring to FIG. 3, the input 116 of the G3 pulse generator 117 is driven from the G2 pulse train output signal as inverted by the inverter 99. As a result, the leading edge of the individual pulses of the G3 pulse train signal will correspond in time to the trailing edges of individual pulses of the G2 pulse train signal as illustrated in FIGS. 10K and 10L. The pulse widths of the G3 pulse train signal may be varied by adjusting the variable resistor 119.

The shaped generator wave form appearing at the output 98 of the wave shaper 97 is also directly applied by means of the inverter 115 to the input 122 of the G4 pulse generator 123. The inverter 115 inverts the shaped generator wave form such that the positive going square wave signals applied to the G4 pulse generator 123 occur at the 180° point of the sensed generator voltage signal. Therefore the leading edges of individual pulses of the pulse train signal appearing at the output 125 of the G4 pulse generator 123 occur in time at the 180° phase reference crossing point of the sensed generator voltage signal, see FIGS. 10G and 10M.

Referring to FIG. 10, the sensed bus and generator output voltage wave forms are phase coincident when corresponding phase reference points on the sensed bus and generator voltage signals occur simultaneously in real time. In the preferred embodiment, all signal references have been referred to the zero angle crossing point of the sensed bus and generator voltage wave forms designated as points a and b, respectively, in FIGS. 10A and 10G. Since the leading edges of individual pulses of the B2 and G2 pulse train signals (FIGS. 10E and 10K), respectively, occur in real time at the zero degree phase angle reference point of the sensed bus and sensed generator voltage signals, (FIGS. 10A and 10G), phase angle synchronization between the sensed bus and generator voltage signals occurs when individual pulses of the B2 and G2 "angle" pulse train signals simultaneously occur in real time. The pulse coincidence of B2 and G2 angle pulses is detected by the phase synchronization AND gate 161 within the synchronizer logic circuit 57 (FIG. 6), and is indicated by a logical level at the output 163 of the AND gate 161.

Although "true" phase angle synchronization between the sensed bus and generator wave forms occurs at real time phase coincidence of the leading edges of individual B2 and G2 angle pulses, a certain amount of phase angle error may be allowed at the instant of connecting the oncoming generator 25 to the bus source 20. This error is represented by a given number of phase angle degrees located on either side of the true phase angle synchronization reference point (the zero degree reference), and gives rise to a phase angle synchronization zone. For example, if it is predetermined that the oncoming generator 25 can be effectively connected in parallel with the bus source 20 without disrupting the bus source output signal even though the phase angles of the bus and generator output signal differ by $x$ phase angle degrees, the allowable phase angle synchronization zones will be plus or minus ($\pm$) $x$ degrees. The phase angle synchronization zone is determined, in the preferred embodiment, by the width of the individual pulses of the B2 and G2 angle pulse train signals. As previously described, the pulse widths of the B2 and G2 angle pulse train signals are determined and may be varied by the variable resistors 88 (FIG. 2) and 112 (FIG. 3), respectively. In the preferred embodiment a phase angle synchronization zone of plus or minus eight degrees, corresponding to B2 and G2 angle pulse widths of eight phase angle degrees, has been selected. It will be understood, however, that any predetermined value may be selected for the phase angle synchronization zone without departing from the spirit or intent of this invention.

Figure 13:
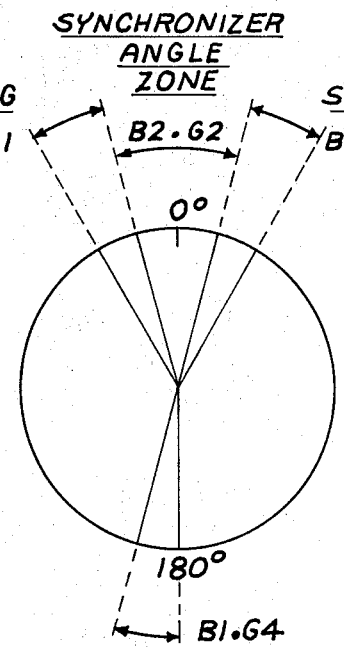
FIG. 13 is a phase angle representation of phase angle and slip timing zones created by the pulse train signals disclosed in FIG. 10.

The phase angle synchronization detection may be illustrated with reference to the phase angle diagram of FIG. 13. The synchronizer angle zone (B2-G2) represents the allowable phase angle synchronization zone during which the phase angles of the bus source 20 and the oncoming generator 25 output voltage signals are sufficiently synchronized to allow connection of the oncoming generator 25 in parallel with the bus source 20. If the B2 and G2 angle pulse train signals were simultaneously viewed on an oscilliscope, and if the frequency of the sensed bus output voltage was faster than that of the sensed generator output voltage, the B2 angle pulse train signal would appear to be moving at a faster rate across the oscilliscope screen than the G2 angle pulse train signal. There would, therefore, be periods of time during which pulses from the B2 angle pulse train signal would "overtake" pulses of the G2 angle pulse train signal. It is that period of time during which pulses from the B2 and G2 angle pulse train signals are "coincident" that define the synchronizer angle zone. It is readily apparent that the length of pulse coincidence depends upon the width of the individual B2 and G2 angle pulses. It should also be noted that the mechanics of performing the phase angle synchronization detection are entirely phase angle dependent and are independent of the voltage or frequency of the bus or generator wave forms.

The binary pulse phase output signal appearing at output 163 of the phase synchronizer AND gate 161 (FIG. 6) is expanded by the pulse stretcher network 165 and provides a first input signal to input 167 of the synchronizer control AND gate 168. In the preferred embodiment, the binary phase output signal appearing at the input 167 is at a logical "one" state when the phase synchronizer gate 161 detects pulse coincidence between the B2 and G2 pulse train signals and is at a logical "zero" state in the absence of pulse coincidence detection by the AND gate 161. It should be noted, that although an AND gate and a pulse stretcher network are employed in the preferred embodiment for detecting phase synchronization, any functionally equivalent logic circuits may be employed to perform the phase synchronization function without departing from the spirit or intent of this invention. It is the detection of coincidence in real time between accurately produced pulse train signals representative of the sensed bus and generator output voltages that defines the invention with respect to phase synchronization.

Frequency synchronization between the bus and generator sensed output signals is detected by logically comparing the B1, G1, B3, G3 and G4 pulse train signals within the synchronizer control logic circuit 57, FIG. 6. Referring to FIG. 10, the B1 and G1 output pulse train signals, designated as the bus and generator zero reference pulse train signals (FIGS. 10C and 10I), respectively, are comprised of marker pulses occurring at the zero phase angle degree reference points (*a* and *b*) of the sensed bus and sensed generator output voltage signals respectively. The B3 and G3 output pulse train signals, designated as slip timing pulse train signals (FIGS. 10F and 10L), have pulses whose leading edges are respectively time coincident with the trailing pulse edges of the B2 and G2 angle pulse train signals. The widths of pulses within the B3 and G3 slip timing pulse train signals are constant and represent a predetermined number of phase angle degrees respectively of the sensed bus and generator voltage signals (FIGS. 10A and 10G). In the preferred embodiment, the width of pulses for both the B3 and G3 pulse train signals represent five phase angle degrees. It will be understood, however, that any predetermined pulse width may be used within the scope of this invention. As previously described, the width of individual pulses within the B3 and G3 pulse train signals is determined and may be altered by means of the variable resistors 93 and 119, respectively, FIGS. 2 and 3.

The G1 generator zero reference pulse train signal and the B3 slip timing pulse train signal are applied as inputs (FIG. 6) to the AND gate 175. The AND gate 175 detects pulse coincidence between individual pulses of the G1 and B3 pulse train signals and energizes the first input 178 of the OR gate 179 in response thereto. Coincidence in time of individual pulses of the G1 and B3 pulse train signals defines a first slip timing angle zone, designated as B3-G1 in FIG. 13.

Similarly, the B1 bus zero reference marker pulse train signal and the G3 slip timing pulse train signal provide inputs to the AND gate 183. The AND gate 183 detects pulse coincidence between individual pulses of the B1 and G3 pulse train signals and enables the second input 180 of the OR gate 179 in response thereto. Coincidence in time of individual pulses of the B1 and G3 pulse train signals define a second slip timing angle zone, designated as B1-G3 in FIG. 13. The pair of slip timing angle zones (FIG. 13) are adjacent to the synchronizer angle zone as a result of the coincidence of the leading pulse edges of the B3 and G3 slip timing pulse train signals, respectively, with the falling pulse edges of the B2 and G2 phase angle pulse train signals.

When pulse coincidence is detected by either of the AND gates 175 or 183 an enable signal is applied to the OR gate 179, indicating that one of the pair of slip timing angle zones has been "entered." Note that the slip timing angle zones will always be entered (FIG. 13) from a rotational direction approaching the zero degree phase angle reference point. Therefore, the OR gate 179 when energized, warns of an approaching phase angle synchronization between the sensed bus and sensed generator voltage signals.

The time duration of pulse coincidence defining one of the pair of slip timing angle zones is a measure of the relative frequency synchronization between the sensed bus and sensed generator output voltage signals. The time duration of pulse coincidence within either of the slip timing angle zones is determined by the slip timer circuit 191 (FIG. 6) and the slip latch locking circuit 195. When pulse coincidence is detected by either of the AND gates 175 or 183, the OR gate 179 by means of the pulse stretcher circuit 188 initiates a timing sequence within the slip timer circuit 191. Upon completion of the preset timing sequence, the slip timer circuit 191 roduces a time-out signal at its output 193. In the preferred embodiment, the timing sequence of the slip timer circuit 191 is energized by the output signal of the OR gate 179. Therefore, should the enabling signal at input 190 be removed from the slip timer circuit 191 before the slip timer circuit has completed its timing sequence, the slip latch locking circuit 195 will not receive a time-out signal.

The slip latch locking circuit 195 provides a binary "frequency" output signal to the second input 170 of the synchronizer control AND gate 168. In the preferred embodiment, the output 197 of the slip latch locking circuit 195 is normally at a logical "zero" state, thus disabling the AND gate 168. Upon receipt of a time-out signal at its input 194 from the slip timer circuit 191, the slip latch locking circuit 195 latches (as hereinafter described), providing a logical "one" output signal at its output 197. Upon receiving a reset signal from the AND gate 201 by its input 196, the slip latch locking circuit 195 is reset, causing its output 197 to resume a logical "zero" state.

The AND gate 201 produces a reset signal at its output 203 upon detection of coincidence between individual pulses of the B1 bus zero reference pulse train signal and the G4 generator 180 degree reference pulse train signal, respectively, FIGS. 10C and 10M. Pulse coincidence detection by the AND gate 201 indicates that the sensed bus and sensed generator output voltage signals are 180 degrees out of phase. The slip latch locking circuit 195 is, therefore, reset once each slip cycle when the sensed bus and generator output wave forms are 180 degrees out of phase.

The operation of a typical latching circuit 219 that can be employed to implement the slip latch locking circuit 195 is illustrated using negative logic elements in FIG. 8. The input 220 to the first NAND gate 222 corresponds to the reset input 196 of the slip latch locking circuit 195. The input 227 to the second NAND gate 226 corresponds to the signal input 194 of the slip latch locking circuit 195. Since negative logic is illustrated, the input 220 from a previous negative logic gate would normally be at a logical high state. Similarly the level of the input 227 would normally be at a logical high state. Since the output 228 of the NAND gate 226 is connected to enable an AND gate of a succeeding state (the synchronizer control logic gate 168) its state must normally occur at a logical low level. Therefore, the input 223 to the NAND gate 222 is low causing the output 224 of the NAND gate 222 to assume a logical high state, thereby completing the circuit. Upon the occurrence of a low state at the input 227 to the NAND gate 226 (corresponding to a timeout signal from the slip timer circuit 191) the output 228 of the NAND gate 226 and the input 223 of the NAND gate 222 will assume a high state, thereby switching the logical state of the NAND gate 222 to a logical low. The output 228 of the NAND gate 226 will, therefore, be "latched" at a high state. The occurrence, thereafter, of a reset signal (a logical low) on the input 220 of the NAND gate 222 will cause the NAND gate 222 to switch, providing a logical high at the input 225 of the NAND gate 226. However, as long as the input 227 to the NAND gate 226 remains at a logical low, the output 228 of the NAND gate 226 and there, also, the output of the latching circuit 219 will remain at a logical high level. As soon as the input 227 to the NAND gate 226 resumes a logical high level, the NAND gate 226 will switch, causing the output 228 of the NAND gate 226 and there also, of the latching circuit 219 to unlatch and to resume a logical low state.

The frequency synchronization detecting circuits, therefore, measure the time duration of pulse coincidence within either of the slip timing angle zones. A sufficiently slow slip frequency between the sensed bus and generator output voltage signals corresponds to a sufficiently long time duration within a slip timing angle zone to allow the slip timer circuit 191 to provide an enabling signal to the input 170 of the synchronizer control AND gate 168. The widths of the G3 and B3 slip timing pulses determine the width in phase angle degrees of the slip timing zones. In the preferred embodiment, the G3 and B3 pulse widths have been selected to yield slip timing angle zones of five phase angle degrees on either side of the synchronizer angle zone. The time duration of pulse coincidence within either of the slip timing angle zones is dependent upon the relative frequencies of the sensed bus and generator output voltage signals. A fast slip frequency between the sensed bus and generator voltage signals corresponds to a short time duration within a slip timing angle zone and does not allow the slip timer circuit 191 to time-out, thereby providing a disable signal to the input 170 of the synchronizer control AND gate 168.

The voltage synchronization enabling signal is produced by the voltage matcher circuit 58. The voltage matcher circuit 58 further provides the voltage matching signals for energizing the raise and lower relay coils 450 and 451, respectively (FIG. 1), for adjusting the output voltage magnitude of the oncoming generator 25. Operation of the voltage matcher circuit 58 can be made with reference to FIGS. 11 and 12. The voltage matcher circuit 58 is illustrated schematically in FIG. 12 and in block diagram form in FIG. 11.

The sensed bus and generator output voltage signals are directly applied by means of the bus and generator input conductors 75 and 95, respectively, to the inputs 340 and 344 of the average voltage transducers 341 and 345. Since the voltage matcher circuit is schematically and functionally symmetrical, a description of its operation may be made with reference to one-half of the circuit. Referring, therefore, to the average voltage transducer 341 (FIG. 12), the bus output voltage is applied to its input 340. A positive signal applied at the input 340 flows through the resistor 346 and the diode 352 to the common 51, thereby reversebiasing the base-emitter junction of the transistor 347, causing the transistor 347 to operate in its cut-off region. A negative signal applied at the input 340 reverse biases the diode 352 and forward biases the base-emitter and collector-emitter junctions of the transistor 347, causing current to flow from the positive supply 100, through the balance adjustment potentiometer 355 and the resistor 353 to the collector (c) of the transistor 347. The current flow through the collector (c) of the transistor 347 is the current analog of the voltage signal applied to the input 340 of the average voltage transducer 341. The capacitor 360 provides a partial filtering of the voltage on the collector (c) of the transistor 347.

THe current analog signal on the collector (c) of the transistor 347 varies the base current drive of the transistor 361 which in turn directly varies the current flow of the PNP transistor 365 within the amplifier 366, establishing a current analog signal at the emitter (e) of the transistor 365. A current path is provided to the emitter (e) of the transistor 365 from the positive supply 100, through the zero adjustment potentiometer 373 and the resistor 371. The signal flow to the emitter (e) of the transistor 365 is filtered by means of the capacitor 370.

The current analog signal flow through the amplifier 366 establishes a definite voltage at the base (b) of the transistor 367. The symmetrical average voltage transducer 345 and the amplifier 394 circuits associated with the sensed oncoming generator 25 output signal have simultaneously provided a definite voltage to the base (b) of the transistor 395. The transistor 367 and 395 comprise the elements of the highest voltage detector 376.

The transistors 367 and 395 of the highest voltage detector 376 are connected in a standard differential amplifier configuration. The voltage signals applied to the bases (b) of the transistors 367 and 395 are applied by means of the respective transistor 367 and 395 emitters (e) to the output conductor 388 of the highest voltage detector circuit 376. The voltage appearing at the output 388 will be the highest of the two voltage signals applied to the bases (b) of the transistors 367 and 395. For example, if the voltage applied to the base (b) of the transistor 367 was higher than that applied to the base (b) of the transistor 395 (corresponding to the bus sensed output voltage having a larger magnitude than the generator sensed output voltage) the voltage appearing at the output 388 of the highest voltage detector 376 will be equal to that applied to the base (b) of the transistor 367 minus the base-emitter diode drop of the transistor 367. In the foregoing example, the transistor 367 would be conducting, establishing current flow through the range control potentiometer 401, the variable resistor 404 and the current source 405 to the common 51. The transistor 395 would simultaneously be non-conducting by virtue of its reverse biased base-emitter junction. The constant current source 405 (implemented by any conventional current source circuit means) establishes a constant voltage increment between the wiper arm 403 and the terminal 400 of the range adjustment potentiometer 401 that equals a presettable percentage of the highest voltage signal applied to the range adjustment potentiometer 401 from the output 388 of the highest voltage detector circuit 376. The percentage is determined by physically setting the wiper arm 403 of the range adjustment potentiometer 401 to the predetermined desired percentage of voltage synchronization matching between magnitudes of the bus and generator output voltage signals.

The voltage increment signal at the wiper 403 of the range adjustment potentiometer 401 is applied to the bases (b) of the transistors 410 and 417 of the voltage comparators 406 and 407, respectively. The voltage comparators 406 and 407 are also schematically and functionally symmetrical. Referring, therefore, to the voltage comparator 406, it is noted that the transistors 413, 415 and 410 are arranged in a standard differential comparator configuration. The input signal applied to the base (b) of the transistor 410 represents a known percentage (increment) of the highest voltage applied to the highest voltage detector circuit 376. The input signal applied to the base (b) of the transistor 413 is the same signal that is applied to the base (b) of the transistor 367 of the highest voltage detector circuit 376. Current flow through the resistor 411 is provided by either or both of the transistors 415 and 410 as determined by their respective base drives. If the voltage applied to the base (b) of the transistor 413 is sufficiently greater than the voltage applied to the base (b) of the transistor 410, the transistors 413 and 415 will conduct, providing current flow through the resistor 411 and causing the voltage level at the emitter (e) of the transistor 415 to equal that of the base (b) of transistor 413 minus two diode voltage drops. Since the emitters (e) of tranistors 410 and 415 are common, the base-emitter junction of transistor 410 will, therefore, be reverse biased.

If, however, the voltage applied to the base (b) of the transistor 410 is greater than that applied to the base (b) of the transistor 413 the opposite result will occur, with transistor 410 conducting and transistor 415 cut-off. The transistor 410 when conducting, establishes a current path for current flow from the base (b) of the PNP transistor 430 of the in-range detector circuit 435. Note that the voltage comparator 407 is simultaneously operating in a symmetrically similar manner. The net effect of the operation of the voltage comparator circuits 406 and 407 is as follows. When the voltage level of the sensed bus 20 output voltage signal is higher than that of the sensed oncoming generator 25 output voltage signal, the transistor 410 of the voltage comparator 406 will not conduct and will not provide base drive to transistor 430. The transistor 417 of the voltage comparator 407 will simultaneously conduct, thereby providing base drive to the transistor 426 of the in-range detector circuit 435. Similarly, when the voltage level of the sensed oncoming generator output voltage signal is greater than that of the sensed bus output voltage signal, the transistor 410 of the voltage comparator 406 will conduct thereby driving the transistor 430; while the transistor 417 of the voltage comparator 407 will be cut-off, disabling the transistor 426.

The collectors (c) of the transistors 430 and 426 of the in-range detector circuit 435 are respectively connected to energize, by means of the relay driver circuits 449 and 445 respectively, the lower 451 and the raise 450 relay coils. Therefore, the transistors 430 and 426 when energized by means of a base drive signal respectively, from the voltage comparators 406 and 407, cause current to flow from the positive supply 50, through the lower 451 and raise 450 relay coil, and the collector-emitter junctions (c-e) of the transistors 447 and 443 respectively, to the common 51. It should be noted that energization of the transistors 430 and 426, and there also of the raise 450 and lower 451 relay coils is mutually exclusive. As previously discussed at the beginning of this section, energization of the raise 450 and lower 451 relay coils adjusts the speed of the potentiometer controlling motor 45 which in turn adjusts the voltage level, by means of the voltage regulator 40, of the oncoming generator 25. The voltage regulator adjustment provided by the voltage matcher circuit 58 is a continuous function that is directly responsive to minute changes in relative voltage levels between the sensed bus and oncoming generator output voltage signals.

When energized, the transistors 430 and 426, by means of their collectors (c) and the resistors 432 and 433 respectively, provide base drive to the transistor 434. The drive signal applied to the base (b) of the transistor 434 drives the transistor 434 into saturation, thereby providing a logical low level at its collector (c). The output signal appearing at the collector (c) of transistor 434 is the voltage synchronization output signal that is applied to the input 169 of the synchronizer control AND gate 168 (FIG. 6). The logical low voltage synchronization output signal will appear at the collector (c) of the transistor 434, thereby disabling the synchronizer control AND gate 168, as long as the voltage magnitudes of the sensed bus and generator output voltage signals are outside of the predetermined voltage synchronization range. When the sensed bus and oncoming generator output voltage signals applied to the inputs 340 and 344 of the voltage matcher circuit 58 are within the predetermined voltage synchronization range, as determined by the setting of the range adjustment potentiometer 401, the input signals applied to the voltage comparator circuit 406 and 407 will be such that the transistors 410 and 417 respectively, of the voltage comparators 406 and 407 will both be non-conducting, thereby causing both transistors 430 and 426 of the in-range detector circuit 435 to not conduct. Consequently, the base drive will be removed from the transistor 434 which will thereafter operate in its cut-off region, allowing the voltage level of the collector (c) of the transistor 434 to rise to a logical high. Therefore, the voltage synchronization output signal from the output 434(c) of the voltage matcher circuit 58 (FIG. 1) is applied to the second input 169 of the synchronizer control AND gate 168. As previously described, the voltage synchronization signal normally occurs at a logical low level whenever the voltage magnitudes of the sensed bus and generator output signals are not matched within the predetermined voltage synchronization range, and occurs at a logical high level whenever the voltage magnitudes of the sensed bus and generator output voltage signals are matched within the predetermined voltage synchronization range. The voltage synchronization output signal produced as above described and provided to the synchronizer control logic 57 satisfies the fast response time requirements of the otherwise digital system.

In the preferred embodiment, the transistors representing symmetrical functions within the voltage matcher circuit 58 (FIG. 12) are comprised of matched dual or quad packaged transistors allowing maximum balance between the symmetrical halves of the circuits and close tracking over temperature variations.

Response time of the voltage matcher circuit 58 is increased by the positive feed-back paths provided by the resistors 436 and 437 to the base (b) of the input transostor 347 and by means of the feed-back path provided by the resistors 440 and 441 to the base (b) of the input transistor 381. The increased response time caused by the positive feed-back results in sharp energization signals to the relay coils 450 and 451 whenever one of the band edges of the voltage synchronization range is determined by the range adjustment potentiometer.

The speed matcher circuit 59 (FIG. 7) automatically provides pulsed relay energizing output signals for adjusting the rotational speed of the oncoming generator 25 to match the frequency of the sensed generator output voltage signal, within predetermined frequency synchronization limits, to that of the sensed bus output voltage signal. A pair of frequency sensor circuits 236 and 259 detect whether the frequency of the oncoming generator sensed output signal is low or high respectively with respect to the bus source sensed output signal. The B1 and G1 bus and generator zero reference marker pulse train signals (FIGS. 10C and 10I) comprise first input signals to the low and the high frequency sensors 236 and 259, respectively. The B0 and G0 bus and generator speed sensing pulse train signals (FIGS. 10D and 10J) respectively comprise the second input signals to the low and the high frequency sensor circuits 236 and 259. The leading edges of pulses from the B0 and G0 speed sensing pulse train signals are respectively time coincident with the zero reference phase angle crossing points (a and b respectively, FIG. 10) of the sensed bus and generator output voltage signals. The width of individual pulses of the B0 and G0 speed sensing pulse train signals equals a predetermined number of phase angle degrees; in the preferred embodiment the pulse widths have been selected to equal 10 phase angle degrees.

The frequency sensors 236 and 259 are functionally symmetrical and may be operationally described with reference to a typical frequency sensor circuit 314 (FIG. 9) employing negative logic. The input 315 to the frequency sensor circuit 314 is synonymous with the G0 and B0 speed sensing pulse train signal inputs 237 and 258 of the low and high frequency sensors 236 and 259 respectively, of FIG. 7. The input 326 of the frequency sensor 314 is synonymous with the B1 and G1 zero reference marker pulse train signal inputs 235 and 260 respectively of the low and high frequency sensor circuits 236 and 259. The signal input 330 of the frequency sensor 314 is synonymous with the lock-out inputs 238 and 261 respectively of the low and high frequency sensors 236 and 259.

The frequency sensor 314 (FIG. 9) generally operates as follows. Normally, the inputs 326, 330 and 315 each are at a logical low level. Therefore, the inputs 326 and 328 of the NAND gate 327 are respectively at logically low and high levels, causing the output 329 of the NAND gate 327 to appear at a logical high level. Since the lock-out input 330 of the frequency sensor circuit 314 has been defined to be at a normally low level, and since the lock-out input (FIG. 7) is connected to the output of a similarly operating frequency sensor, the output 325 must necessarily be at a normally low level. Therefore, the inputs 320 and 318 of the NAND gate 319 are respectively at logical low and high levels, causing the output 321 of the NAND gate 319 to be at a logical high level. Inputs 324 and 322 of the NAND gate 323 are, therefore, logically high, causing a logical low at the output 325, thereby completing the circuit in the normally unexcited condition.

Upon the occurrence of an input pulse at the input 326 of the frequency sensor 314, both inputs of the NAND gate 327 will be logically high, causing the NAND gates 327 and 323 to sequentially switch, providing logical low and high levels at the outputs 329 and 325 respectively. The resultant high level at the input 320 of the NAND gate 319, when combined with the normally high level at the input 318 will cause the NAND gate 319 to switch, creating a low level at its output 321. The low input levels at the 322 and 324 inputs of the NAND gate 323 will, therefore, lock the output level of the output 325 of the NAND gate 323 at a logical high level which will thereafter be maintained even after the high level input pulse at input 326 is removed. When a logical high input pulse is thereafter applied to the input 315 of the frequency sensor 314, the input 318 of the NAND gate 319 will assume a logical low level, which will cause the NAND gate 319 to switch, thereby providing a logical high reset level to the input 322 of the NAND gate 323.

Since the input pulses applied to the input 326 (the B1 or G1 pulses) are of much shorter time duration than those applied to the input 315 (the B0 or G0 pulses), the logical level at the input 324 of the NAND gate 323 will normally occur as a logical high when the logical high reset signal is applied to the input 322 of the NAND gate 323. As a result, the reset signal applied to the input 322 will normally cause the NAND gate 323 to switch, resulting in a logical low at its output 325. Therefore, the output 325 of the frequency sensor 314 will normally assume a logical low level except during that time interval during which positive input pulses are sequentially and respectively applied to the inputs 326 and 315 of the frequency sensor 314. Note, however, that a logical high signal applied to the lock-out input 330 of the frequency sensor 314 will lock the output 329 of the NAND gate 327 at a logical high, thereby also locking the output 325 of the NAND gate 323 at a logical low, in effect disabling the frequency sensor circuit.

With reference to FIG. 7, therefore, the outputs 239 and 262 of the low and high frequency sensor circuits 236 and 259 respectively, will assume a logical high output level upon the application of a positive marker pulse at their respective marker pulse signal inputs 235 and 260. Since the output signal of one frequency sensor circuit also comprises the lock-out input signal to the other frequency sensor circuit, activation of one of the frequency sensor circuits will automatically lock out (disable) enabling of the other frequency sensor circuit. For example, if the low frequency sensor circuit 236 is enabled by means of a B1 marker pulse signal applied to its input 235 its output 239 will assume a logical high level which will disable the high frequency sensor circuit 259 by means of a lock-out signal applied at the input 261 until the output 239 of the low frequency sensor 236 has resumed a logical low level.

In general, referring to FIG. 10, if the frequency of the oncoming generator sensed output voltage signal (FIG. 10G) is greater than that of the sensed bus voltage signal (FIG. 10A), the pulse repetition rate of the G1 generator zero reference marker pulse train signal will necessarily be greater than that of the B1 bus zero reference marker pulse train signal. Therefore, pulses from the G1 pulse train signal will excite the input 260 of the high frequency sensor 259 (FIG. 7) at a faster rate than pulses from the B1 pulse train signal will excite the input 235 of the low frequency sensor circuit 236. As a result, the high frequency sensor circuit 259 will be enabled by means of its inputs 260 prior to enabling low frequency sensor 236 and will transmit a lock-out signal by means of its output 261 to the low frequency sensor 236. The opposite result occurs with respect to excitation of the low frequency sensor 236 prior to that of the high frequency sensor 259 when the sensed bus output voltage signal frequency exceeds that of the sensed generator output voltage signal.

Assuming that the high frequency sensor circuit 259 is enabled, a logical high level input is applied to the input 265 of the AND gate 266. The AND gate 243 is simultaneously disabled as a result of the logical low level applied to its input 242 from the output 239 of the disabled low frequency sensor circuit 236. The second inputs 267 and 244 of the AND gates 266 and 243 are enabled by a signal from the output 303 of the logical OR gate 301. One input to the OR gate 301 is provided by means of the pulse stretcher circuit 306 from the AND gate 201 (FIG. 6). As previously described, the output 203 of the ANDgate 201 assumes a logical high level when the sensed bus and generator input voltage signals are 180° out of phase. Therefore, the logical AND gates 266 and 243 may upon excitation by the high and low frequency sensor circuits 259 and 236 respectively, be enabled when the bus and generator sensed output voltage signals rare 180° out of phase.

The AND gates 266 and 243, when enabled, respectively provide input latching signals to the lower and raise speed latching circuits 271 and 247. The lower and raise speed latching circuits 271 and 247, in the preferred embodiment, are similar in construction and operation to that of the typical latching circuits previously described with reference to FIG. 8. When in a latched condition, the lower and raise speed latching circuits 271 and 247 respectively provide enabling signals to the lower and raise relay driver circuits 276 and 253, and also enable the logical OR gate 282. It should be noted that since only one of the frequency sensor circuits may be activated at a time, the operation of the raise and lower speed latching circuits 247 and 271 is also mutually exclusive. The OR gate 282, when enabled by either of its inputs 280 and 281, provides an enabling output signal to the preset timer 291 and to the pulse width timer 286. The pulse width timer 286 provides a time-out signal at its output 288 after a predetermined length of time. The time-out duration is adjustable by means of the variable resistor 287 as previously described. The time-out signal produced at the output 288 of the pulse width timer circuit 286 provides a reset signal to the inputs 272 and 248 of the lower and raise speed latching circuits 271 and 247 respectively, thereby producing unlatching signals at the outputs 273 and 249 respectively and deactivating the lower and raise relay driver circuits 276 and 253. The resultant signal as viewed at the output 278 or 255 of the speed matcher circuit 59 is a pulse of current flowing from the positive supply 50 respectively through either the lower or raise relay coils 311 or 310, that coil energized corresponding respectively with activation of the high or low frequency sensor circuits 259 or 236.

The preset timer 291, upon time-out, provides a latching signal to the input 294 of the timer latch circuit 295. The timer latch circuit 295 is, in the preferred embodiment, functionally similar to the typical latch circuit previously described with respect to FIG. 8. The output 297 of the timer latch circuit when in a latched state provides the second input to the OR gate 301. The time-out period of the preset timer 291 is set at a relatively long time-out period, in the preferred embodiment at twenty seconds, and provides an enabling signal to the AND gates 266 and 243 for effecting an energizing signal to the lower or raise relay coils 311 and 310 when the frequencies of the sensed bus and generator output voltage signals are closely matched but are significantly out of phase such that the phase angle detection circuit could not detect phase angle synchronization. For example, if th sensed bus and generator voltage output signals have nearly the same frequency, the slip frequency, giving rise to the 180° out of phase signal input at pin 305 will be extremely low, essentially disabling the speed matcher circuit 59. The sensed bus and generator output voltage signals may become "fixed" at a phase angle relative to each other such that the phase angle synchronization detection circuit as previously described, will never be able to detect phase angle synchronization. This situation will occur when the relative phase angle separation between the sensed bus and generator output voltage signals is greater than the phase angle synchronization zone, and if the slip frequency is essentially zero. Therefore, the preset timer 291 functions to provide an enabling signal for the raise or lower speed latching circuits by means of the AND gates 266 and 243 for providing a speed adjusting pulse to the relay coils 310 and 311, thereby increasing the slip frequency and effecting a shift in the relative phase angle between the sensed bus and generator output voltage signals.

The time-out signal from the pulse width timer 286 also provides a reset signal to the input 296 of the timer latch circuit 295 on each slip cycle at the 180° out of phase reference point, thereby resetting the timer latching circuit 295.

Since the speed matching circuit 59 provides pulsed signals to the raise or lower relay coil 310 and 311 respectively, for each slip cycle, the speed matching function is directly responsive to the magnitude of the slip frequency difference between the sensed bus and generator output voltage signals. Since the number of speed matching correction signals sent to the prime mover engine of the oncoming generator 25 is directly proportional to the slip frequency between the sensed bus and generator output voltage wave forms, when the slip frequency is large the speed adjusting signals provided to the governor 47 of the prime mover engine 48 will appear as a continuous signal. However, as the slip frequency decreases, the adjustment signals provided to the governor 47 will also proportionately decrease lending a maximally efficient automatic fine tuning of the relative frequencies of the bus and generator output wave form signals.

The fourth logical input to the synchronizer control AND gate 168 (FIG. 6) is applied to the input 171. The logical level of the input 171 is normally at a logical high, thereby allowing enabling of the AND gate 168 when the inputs 167, 169 and 170 are simultaneously at logical highs. When logically high, the phase, frequency and voltage synchronization enabling signals applied respectively to the inputs 167, 170 and 169 of the AND gate 168 cause the AND gate 168 to switch, causing a logical high level to appear at its output 172. The logical high output from the AND gate 168 causes the lock-out pulse generator 206 to produce a pulse at its output 207 for triggering the input 208 of the lock-out latch circuit 209. Upon application of the triggering pulse to the input 208 of the lock-out latch circuit 209, the output 210 of the latching circuit 209 is latched at a logical low level, thereafter disabling the AND gate 168. The output 210 of the lock-out latch circuit 209 will remain at a logical low level until a rest signal is applied to its input 211. The lock-out pulse generator 206 and the lock-out latch circuit 209 are of the typical pulse generator and latch circuit configurations as previously described with reference respectively to FIGS. 5 and 8.

As a result of the lock-out signal applied to the input 171 of the synchronizer control AND gate 168, the AND gate 168 can be enabled through its inputs 167, 169 and 170 for providing a logical high at its output 172 only once. Subsequent enabling of the AND gate 168 will require a reset signal to be applied to the input 211 of the lock-out latch circuit 209. Enabling of the AND gate 168 energizes the relay driver circuit 213 which causes current to flow from the positive supply 50, through the circuit breaker energizing coil 34, and through the output 215 of the relay driver circuit 213 to the common 51. Energization of the circuit breaker coil 34 causes the movable contacts 31, 32 and 33 to connect in parallel the output lines of the bus source 20 and the oncoming generator 25.

A better understanding of the operation of the synchronizer control AND gate 168 is provided by consideration of the timing sequence of the signals applied to the input of the AND gate 168. From the foregoing description of the means employed to generate the phase, frequency and voltage input signals to the AND gate 168, the following will be recognized. The voltage synchronization enabling signal applied to the input 169 of the AND gate 168 continuously occurs at a logical high whenever the voltage magnitudes of the sensed bus and generator output voltage signals are within the predetermined voltage synchronization range. Since the slip frequency timing detection operation occurs within a slip timing phase angle zone adjacent to and preceding in real time the synchronizer angle zone (FIG. 13), the logical high frequency synchronization enabling signal will be applied to the input 170 of the AND gate 168 when the frequencies of the sensed bus and generator output voltage signals are within the predetermined frequency synchronization range. The final enabling signal to the AND gate 168 is provided to the input 167 by a logical high level corresponding to the phase angle synchronization enabling signal when the phase angles of the sensed bus and generator output voltage wave forms are matched within the predetermined phase angle synchronization range.

It is obvious, that when the frequencies of the sensed bus and generator voltage wave forms are not matched within the predetermined frequency synchronization range, the input 170 of the AND gate 168 will remain at a logical low thereby disabling the AND gate 168 even though logically high phase and voltage synchronization enabling signals and lock-out enabling signals are respectively applied to the inputs 167, 169 and 171.

Further, since under proper synchronization matching conditions the phase angle synchronization signal is the last to be applied to the synchronizer control AND gate 168, and since the phase angle synchronization detection occurs within a synchronizer angle zone centered about the true phase angle synchronization point, the AND gate 168 will be energized in real time prior to actual phase angle synchronization by a time period corresponding to one-half of the synchronizer angle zone (in the preferred embodiment, eight degrees = 0.3704 miliseconds for a 60 hertz time base). This activation of the synchronizer control AND gate 168 prior to the true phase angle synchronization matching allows for the anticipated physical delay associated with the closing time of the movable contacts of the circuit breaker 30.

While we have disclosed a specific embodiment of our invention, it is to be understood that this is for the purpose of illustration only, and that our invention is to be limited only by the scope of the appended claims.

We claim:

1. Apparatus for determining phase and frequency synchronization of two electric AC sources comprising:

a. means connected to sense output voltages of first and second AC sources for providing first and second AC sensed output signals respectively in response thereto;

b. means operatively connected to receive said first and second AC sensed signals for respectively producing therefrom a plurality of first and second source binary pulse train signals having pulse repetition rates directly proportional to the frequencies of said first and second sensed AC signals respectively and having individual pulse widths independent of the frequencies of said sensed signals and representative respectively of a predetermined number of first and second source phase angle degrees; and c. digital circuit means connected to receive said plurality of first and second source binary pulse train signals for detecting time coincidence between pulses from selected pulse trains of said first and second pulse train signals and for providing in response thereto:

1. phase output signals indicative of phase angle matching, within a predetermined allowable phase matching range, between said first and second AC sensed signals, and 2. frequency output signals indicative of frequency matching, within a predetermined allowable frequency matching range, between said first and second AC sensed signals.

2. Apparatus for determining phase and frequency synchronization of two electrical AC sources accordign to claim 1, including circuit means operatively connected to receive said phase and frequency output signals of said digital circuit means and operable in one state for producing a first output signal when said received phase and frequency signals simultaneously indicate said phase and frequency matching, and operable in another state for producing a second output signal different from said first output signal when said received phase and frequency signals do not simultaneously indicate said phase and frequency matching.

3. Apparatus for determining phase and frequency synchronization of two electrical AC sources according to claim 1, wherein said means for producing said plurality of first and second source binary pulse train signals includes means for providing first and second source phase angle pulse train signals each characterized by pulses of constant predetermined width and similarly positioned in phase relationship to the zero degree phase angle reference points respectively of said first and second AC source sensed signals; and wherein said digital circuit means includes logic gate means connected to receive said first and second source phase angle pulse train signals operable in one mode for producing a first phase output signal when pulses from said first and second phase angle pulse train signals are coincidentally received thereby and operable in another mode for producing a second phase output signal different from said first output signal when pulses from said first and second phase angle pulse train signals are not coincidentally received thereby.

4. Apparatus for determining phase and frequency synchronization of two electrical AC sources according to claim 1, wherein said means for producing said plurality of first and second source binary pulse train signals includes means for providing at least one pair of pulse train signals for determining said frequency matching, wherein said pair of pulse train signals comprises a first pulse train signal having pulses of constant predetermined width and a pulse repetition rate directly proportional to the frequency of said first AC source sensed signal, and a second pulse train signal having pulses of constant predetermined width and a pulse repetition rate directly proportional to the frequency of said second AC source sensed signal; and wherein said digital circuit means includes a frequency synchronization detecting circuit comprising:

a. logical circuit means operatively connected to receive said pair of pulse train signals for producing in response thereto a first output signal whenever pulses from said first and second output pulse train signals are coincidentally received and for producing a second output signal whenever pulses from said first and second pulse train signals are not coincidentally received; and b. timing circuit means operatively connected to receive said first and second output signals for measuring the continuous time duration of said received second output signal, wherein said timing circuit means is normally operative in a first mode to produce a first output frequency signal when said first output signal is received and when said second output signal is continuously received for a time less than a predetermined period of time, and is operative in a second mode to produce a second frequency output signal different from said first output signal after said second output signal has been continuously received for a length of time greater than said predetermined period of time.

5. Apparatus for determining phase and frequency synchronization of two electrical AC sources according to claim 4, including circuit means for producing a periodic reset output signal whose frequency is proportional to one of said first and second AC sensed signals, and wherein said timing circuit means includes means connected to receive said reset output signal for causing in response thereto said timing circuit means when operating in its second mode to resume operation in its first mode.

6. An improved automatic synchronizing apparatus for connecting an oncoming AC generator source in parallel with an energized AC bus source comprising:

a. sensing means for sensing corresponding output voltages of said generator and said bus sources, and for respectively providing sensed generator and bus AC output signals in response thereto;

b. means operatively connected to receive said sensed generator and bus signals for respectively producing therefrom a plurality of binary generator and bus output pulse train signals;

c. phase synchronizer gating means operatively connected to receive at least one each of said generator and bus binary output pulse train signals, for digitally comparing said received binary pulse train signals and for producing in response thereto a binary phase output signal, wherein said phase synchronizer gating means is operable to cause said binary phase output signal to assume first and second binary output levels respectively when said generator and bus sensed signals are and are not simultaneously within a predetermined number of phase angle degrees of each other;

d. frequency synchronizer circuit means operatively connected to receive at least one each of said generator and bus binary output pulse train signals for digitally comparing the frequencies thereof and for producing in response thereto a binary frequency output signal, wherein said frequency synchronizer circuit means is operable to cause said binary frequency output signal to assume first and second binary output levels respectively when the frequencies of said sensed bus and generator signals are and are not within a predetermined frequency synchronization range of each other;

e. voltage synchronizer circuit means operatively connected to receive said sensed generator and bus AC output signal for comparing the voltage levels of said received sensed signals and for producing in response thereto a binary voltage output signal, wherein said voltage synchronizer circuit means is operable to cause said voltage binary output signal to assume first and second binary output levels respectively when said received sensed voltage levels are and are not within a predetermined voltage synchronization range of each other;

f. synchronizer control circuit means operatively connected to receive said binary phase, frequency and voltage output signals for producing a synchronizing output signal; said synchronizer control means being operable in a first state to produce a first level synchronizing output signal whenever said first binary levels of said phase, frequency and voltage output signals are simultaneously received, and operable in a second state to produce a second level synchronizing output signal whenever one or more of said second binary levels of said phase, frequency and voltage output signals is received; and g. switching circuit means operatively connected to said generator and bus sources and for receiving said synchronizing output signal, normally operable upon receipt of said first level synchronizing signal in an open mode for electrically isolating said bus and oncoming generator sources, and operable in a closed mode upon receipt of said second level synchronizing signal for electrically connecting in parallel said bus and generator sources.

7. An improved automatic synchronizing apparatus for connecting an oncoming AC generator source in parallel with an energized AC bus source according to claim 6, wherein said means for producing said plurality of pulse train signals includes means for causing each of said plurality of binary generator output pulse train signals to be characterized by pulse repetition rates directly proportional to the frequency of said sensed generator AC signal and by individual pulses of constant predetermined width within any given pulse train signal, and further includes means for causing each of said binary bus output pulse train signals to be characterized by a pulse repetition rate directly proportional to the frequency of said sensed bus AC signal and by individual pulses of constant predetermined width within any given pulse train signal.

8. An improved automatic synchronizing apparatus for connecting an oncoming AC generator source in parallel with an energized AC bus source according to claim 6, wherein said sensing means produces generally sinusoidal sensed generator and bus AC output signals and wherein said means for producing said plurality of bus and generator output pulse train signals comprises:

a. bus and generator wave shaper circuit means operatively connected to receive respectively said sinusoidal bus and generator sensed AC signals and for respectively shaping said received bus and generator sensed signals for producing squared bus and generator output signals having frequencies respectively equal to said received bus and generator sensed signals;

b. bus pulse generating cicuit means operatively connected to receive said square bus output signal for producing in response thereto said plurality of binary bus output pulse train signals, each having a pulse repetition rate equal to the frequency of said squared bus signal and having pulses whose widths equal a predetermined number of phase angle degrees of said squared bus signal and are constant for individual pulse train signals; and c. generator pulse generating circuit means operatively connected to receive said squared generator output signal for producing in response thereto said plurality of binary generator pulse train signals, each having a pulse repetition rate equal to the frequency of said squared generator output signal and having pulses whose widths equal a predetermined number of phase angle degrees of said squared generator signal and are constant for individual pulse train signals.

9. An improved automatic synchronizing apparatus for connecting an oncoming AC generator source in parallel with an energized AC bus source according to claim 7, wherein said means for producing said plurality of bus and generator output pulse train signals include means for producing a bus and a generator angle pulse train signal each having individual pulses whose leading edges are respectively time coincident with like phase angle reference points of said sensed bus and generator signals and whose widths are constant and equal respectively a predetermined number of bus and generator phase angle degrees; and wherein said phase synchronizer gating means is operatively connected to receive said bus and generator angle pulse train signals for detecting coincidence in time of pulses from said bus and generator angle pulse train signals, and for producing in response thereto said binary phase output signal.

10. An improved automatic synchronizing apparatus for connecting an oncoming AC generator source in parallel with an energized AC bus source according to claim 9, wherein said phase synchronizer gating means includes a coincident gating circuit operatively connected for receiving said bus and generator angle pulse train signals for producing therefrom said binary phase output signal, said coincident gating circuit being operable in one mode to cause said binary phase output signal to assume said first binary output level when pulses from said bus and generator angle pulse train signals are simultaneously received, and operable in a second mode to cause said binary phase output signal to assume said second binary output level when pulses from said bus and generator angle pulse train signals are not simultaneously received.

11. An improved automatic synchronizing apparatus for connecting an oncoming AC generator source in parallel with an energized AC bus source according to claim 10, wherein said phase synchronizer gating means includes pulse stretching means operatively connected to receive said binary phase output signal for altering said binary phase output signal so as to expand the time duration at which it appears at said second binary level.

12. An improved automatic synchronizing apparatus for connecting an oncoming AC generator source in parallel with an energized AC bus source according to claim 7, wherein said means for producing said plurality of binary generator and bus output pulse train signals include means for producing generator slip timing and bus reference marker pulse train signals each being characterized by pulses of constant widths and having leading pulse edges that are respectively time coincident with a predetermined fixed phase angle of said sensed generator and bus signals; wherein individual pulses from said generator slip timing and said bus reference marker pulse train signals when coincident in time, define a slip angle timing zone whose real time period varies with the relative frequencies of said sensed generator and bus signals; and wherein said frequency synchronizer circuit means includes means operatively connected to receive said generator slip timing and said bus reference marker pulse train signals for detecting and measuring the time coincidence of pulses from said received signals and for varying in response thereto said binary frequency output signal.

13. An improved automatic synchronizing apparatus for connecting an oncoming AC generator source in parallel with an energized AC bus source according to claim 9, wherein said means for producing said plurality of binary bus and generator output pulse train signals include means for producing bus slip timing and generator reference marker pulse train signals each characterized by pulses of constant predetermined widths and having pulse leading edges respectively time coincident with a predetermined fixed phase angle of said sensed bus and generator signals; wherein respective pulses from said bus slip timing and generator reference marker pulse train signals when coincident in time, define a first periodic slip angle timing zone whose real time period varies with the relative frequencies of said sensed generator and bus signals; and wherein said frequency synchronizer circuit means includes means operatively connected to receive said bus slip timing and generator reference marker pulse train signals for detecting and measuring the time coincidence of pulses from said received signals and for varying in response thereto said binary frequency output signal.

14. An improved automatic synchronizing apparatus for connecting an oncoming AC generator source in parallel with an energized AC bus source according to claim 13, wherein said means for producing said plurality of binary generator and bus output pulse train signals include means for producing generator slip timing and bus reference marker pulse train signals each being characterized by pulses of constant width having pulse leading edges respectively time coincident with a predetermined fixed phase angle of said sensed generator and bus signals; wherein respective pulses from said generator slip timing an said bus reference marker pulse train signals when time coincident, define a second slip angle timing zone whose real time period varies with the relative frequencies of said sensed generator and bus signals; and wherein said frequency synchronizer circuit means includes means operatively connected to receive said generator slip timing and said bus reference marker pulse train signals for measuring the time coincidence of pulses from said received signals and for varying in response thereto said binary frequency output signal.

15. An improved automatic synchronizing apparatus for connecting an AC generator source in parallel with an energized AC bus source according to claim 14, including means colectively connecting said bus and generator slip timing, reference marker and angle pulse train signal producing means for causing synchronous operation thereof such that the leading pulse edges of said bus and generator marker pulse train signals are time coincident respectively with the leading edges of said bus and generator amgle pulse train signals, and the leading pulse edges of said bus generator slip timing pulse train signals respectively trail in time the trailing pulse edges respectively of said bus and generator angle pulse train signals; and wherein said frequency synchronizer circuit means includes:

a. input logic means operatively connected to receive pulses of said bus and generator reference marker and slip timing pulse train signals, for detecting time coincidence therebetween and for producing in response thereto an output enable signal whenever pulses either from said bus reference marker and said generator slip timing signals or from said generator reference marker and said bus slip timing signals are simultaneously received, and for producing a disable output signal whenever said reference marker and slip timing signals are not simultaneously received;

b. timing circuit means operatively connected to receive said enable and disable signals for providing a timer output signal in response thereto, said timing circuit means operable to produce a first timer output signal whenever said disable signal is received or said enable signal is received for a length of time less than a preset time interval, and operable to produce a second timer output signal, differing from said first timer output signal, after said enable signal has been continuously received for a length of time longer than said preset time interval; and c. latching circuit means having first input means operatively connected to receive said first and second timer output signals and second input means adapted to receive a reset signal for producing said binary frequency output signal; said latching circuit means operable to vary said binary frequency output signal in response to said received input signals for causing said binary frequency output signal to assume said second binary level whenever said second timer output signal or a reset signal are respectively received by said first and second input means, and operable to cause said binary frequency output signal to assume said first binary output level when said second timer output signal is received by said first input means.

16. An improved automatic synchronizing apparatus for connecting an oncoming AC generator source in parallel with an energized AC bus source according to claim 15, wherein said bus and generator angle pulse train producing means include means for causing the leading pulse edges of said bus and generator angle pulse train signals to be respectively time coincident with the zero degree phase angle reference points of said bus and generator sensed AC signals; wherein said means for producing said plurality of binary generator output pulse train signals include means for producing an out of phase reference pulse train signal having binary pulses whose leading edges are time coincident with a definite phase angle reference point of said sensed generator signal, said definite phase angle reference point being out of phase with that said phase angle point to which pulses from said angle pulse train signals are referenced; and including means operatively connecting said reset input means of said latching circuit means to receive said out of phase reference pulse train signal as said reset signal.

17. An improved automatic synchronizing apparatus for connecting an oncoming AC generator source in parallel with an energized AC bus source according to claim 6, including lock-out circuit means having an input connected to receive said synchronizing output signal, normally operable in a first state upon receipt of said first level synchronizing output signal for producing an enabling lock-out output signal and operable in a second locking state upon receipt of said second level synchronizing output signal for thereafter producing a second lock-out output signal; and wherein said synchronizer control circuit means further contains means operatively connected to receive said enabling and second lock-out output signals for causing said synchronizer control means to become operable in its first state to produce said first level synchronizing output signal whenever said phase, frequency and voltage first binary levels and said enabling lockout output signals are simultaneously received and to become operable in its second state to produce said second level synchronizing output signal whenever one or more of said phase, frequency and voltage second binary levels or said second lockout output signal is received.

18. An improved automatic synchronizing apparatus for connecting an oncoming AC generator source in parallel with an energized AC bus source according to claim 6, including speed matching circuit means operatively connected to receive said plurality of binary generator and bus output pulse train signals for effecting in response thereto changes in the output signal frequency of said oncoming generator in a direction causing the frequency of said sensed generator output signal to approach that of said sensed bus output signal.

19. An improved automatic synchronizing apparatus for connecting an oncoming AC generator source in parallel with an energized AC bus source according to claim 18, wherein said speed matching circuit means for effecting said change in the oncoming generator frequency by providing pulsed output raise and lower output signals for controlling speed regulating motor means of said oncoming generator source.

20. An improved automatic synchronizing apparatus for connecting an oncoming AC generator source in parallel with an energized AC bus source according to claim 19, wherein said means for producing said plurality of binary bus and generator pulse train signals includes means for producig said bus and generator pulse train signals having pulse repetition rates respectively equal to the frequencies of said sensed bus and generator signals, means for producing bus and generator reference marker pulse train signals each having pulses whose leading edges are time coincident respectively with like pahse angles of said sensed bus and generator signals, and means for producing bus and generator speed sensing pulse train signals each having pulses whose leading edges are time coincident respectively with like phase angles of said sensed bus and generator signals; and wherein said speed matching circuit means includes:
   a. low frequency sensing logic means operatively connected to receive said bus reference marker and said generator speed sensing pulse train signals for producing in response thereto a logical low frequency output signal when pulses from said bus reference and said generator speed sensing signals are simultaneously received;
   b. high frequency sensing logic means operatively connected to receive said generator reference and said bus speed sensing pulse train signals for producing in response thereto a logical high frequency output signal when pulses from said generator reference and said bus speed sensing signals are simultaneously received; and
   c. drive circuit means operatively connected to receive said logical high frequency and low frequency output signals for producing respectively therefrom said lower and raise output signals.

21. An improved automatic synchronizing apparatus for connecting an oncoming AC generator source in parallel with an energized AC bus source according to claim 20, wherein said low frequency sensing logic means includes means for causing said logical high frequency output signal to assume first and second binary output levels respectively when pulses from said generator reference and said bus speed sensing pulse train signals are and are not simultaneously received; and wherein said drive circuit means includes means for producing said lower output signal when said high frequency output signal assumes its first output level and to produce said raise output signal when said low frequency output signal assumes its first output level.

22. An improved automatic synchronizing apparatus for connecting an oncoming AC generator source in parallel wtih an energized AC bus source according to claim 21, wherein said drive circuit means includes first timing circuit means operatively connected to produce a first timing signal for controlling the pulse width of individual pulses of said raise and lower output signals.

23. An improved automatic synchronizing apparatus for connecting an oncoming AC generator source in parallel with an energized AC bus source according to claim 22, including circuit means operatively connected to receive selected signals from said plurality of binary generator and bus output pulse train signals and for producing a triggering signal in response thereto; and wherein said drive circuit means includes inhibiting circuit means connected to receive as inputs said low and high frequency binary logic output signals and said triggering signals for inhibiting said raise and lower output pulse signals in response to said triggering signal.

24. An improved automatic synchronizing apparatus for connecting an oncoming AC generator source in parallel with an energized AC bus source according to claim 23, wherein said means for producing said plurality of generator binary output pulse train signals includes means for producing an out of phase pulse train signal having pulses whose leading edges periodically occur at time intervals so as to be out of phase with the leading pulse edges of said generator reference marker pulse train signal; wherein said circuit means for producing said triggering signal comprises conicident gating means operatively connected to receive said generator out of phase and said bus reference marker pulse train signals for producing said triggering signal when pulses from said generator out of phase and said bus reference pulse train signals are simultaneously received, and wherein said inhibiting circuit means includes:
   a. first AND logic gate means connected to receive as inputs said binary low frequency output and said triggering signals, for producing a first AND gate output signal when said low frequency output signal appearing at said first level is received simultaneously with said triggering signals;
   b. second AND logic gate means connected to receive as inputs said binary high frequency and said triggering signals, for producing a second AND gate output signal when said high frequency output signal appearing at said first level is received simultaneously with said triggering signal;
   c. raise speed latch circuit means operatively connected to receive said first AND gate output signal and said first timing signal for producing, when enabled by said first AND gate output signal, said raise output pulse signal in response to said first timing signal; and
   d. lower speed latch circuit means operatively connected to receive said second AND gate output signal and said first timing signal for producing, when enabled by said second AND gate output signal, said lower output pulse signal in response to said first timing signal.

25. An improved automatic synchronizing apparatus for connecting an oncoming AC generator source in parallel with an energized AC bus source according to claim 24, including second timing means having an enable input operatively connected to receive said first timing signal, said second timing means being operable when enabled by said first timing signal for producing a second timing signal delayed in time from receipt of said first timing enabling signal by a first preset time interval; wherein said inhibiting circuit means also includes gating means operatively connected to receive as inputs said second timing signal and said triggering signal for providing a triggering output signal upon receiving said second timing signal or said triggering signal; and wherein said triggering signal received as an input by said first and second AND logic gate means comprises said gate triggering output signal.

26. An improved automatic synchronizing apparatus for connecting an oncoming AC generator source in parallel with an energized AC bus source according to claim 25, including means operatively connecting said first timing circuit means to receive as enabling inputs said raise and lower signals, and wherein said first timing circuit means includes means for causing said first timing signal to be produced delayed in time from the receipt of said raise or lower enabling source by a second preset adjustable time interval.

27. An improved automatic synchronizing apparatus for connecting an oncoming AC generator source in parallel with an energized AC bus source according to claim 25, including means collectively connecting said bus and generator reference and speed sensing pulse train signal producing means for causing synchronous operation thereof such that the leading pulse edges of said bus and generator reference pulse train signals are time coincident respectively with first predetermined like phase angles of said sensed bus and generator AC signals, the leading pulse edges of said bus and generator speed sensing pulse train signals are respectively time coincident with said first predetermined like phase angles of sensed bus and generator AC signals, and the leading pulse edges of said generator reference pulse train signal are time coincident with a second predetermined phase angle of said sensed generator AC signal; said second phase angle differing from said first phase angle by approximately 180°.

28. An improved automatic synchronizing apparatus for connecting an oncoming AC generator source in parallel with an energized AC bus source according to claim 6, wherein said voltage synchronizer means includes voltage matching circuit means connected to receive said sensed bus and generator output voltages for producing in response thereto output voltage matching signals for effecting a change in the output voltage level of said oncoming generator in a direction causing the sensed generator output voltage to approach that of said sensed bus output.

29. An improved automatic synchronizing apparatus for connecting an oncoming AC generator source in parallel with an energized AC bus source according to claim 28, wherein said synchronizing apparatus includes voltage regulating means connected to receive said voltage matching signals for raising and lowering the output voltage level of said oncoming generator source in response thereto.

30. An improved automatic synchronizing apparatus for connecting an oncoming AC generator source in parallel with an energized AC bus source according to claim 28, wherein said voltage synchronizer means includes:
 a. input circuit means for producing averaged bus and generator signals respectively from said sensed bus and generator output signals;
 b. control circuit means operatively connected to receive said averaged bus and generator signals for selectively producing at its output one of said averaged signals shifted in magnitude by a predetermined voltage increment;
 c. comparator means operatively connected to receive said averaged bus and generator signals and the incremented averaged signal for producing first and second comparator output signals in response thereto; and
 d. output circuit means operatively connected to receive said first and second comparator output signals for producing in response thereto said binary voltage output signal and said output matching signals.

31. An improved automatic synchronizing apparatus for connecting an oncoming AC generator source in parallel with an energized AC bus source according to claim 30, wherein said input means comprises voltage transducer circuit means operatively connected to receive said bus and generator sensed output voltage signals for producing respectively therefrom averaged bus and generator current analog signals.

32. An improved automatic synchronzing apparatus for connecting an oncoming AC generator source in parallel with an energized AC bus source according to claim 31, wherein said voltage transducer means includes first and second voltage transducers each having input transistor and filtering circuits, said voltage transducer means being operatively connected for respectively receiving said sensed bus and generator signals and for producing said bus and generator current analog signals in response thereto.

33. An improved automatic synchronizing apparatus for connecting an oncoming AC generator source in parallel with an energized AC bus source according to claim 30, wherein said control circuit means includes means for adjusting said predetermined voltage increment level within a predetermined voltage tolerance band, said adjustment within the tolerance band defining said voltage synchronization range.

34. An improved automatic synchronizing apparatus for connecting an oncoming AC generator source in parallel with an energized AC bus source according to claim 33, wherein said control circuit means includes:

a. level detecting means connected to receive said averaged bus and generator signals for providing a detected output signal proportional to the larger of said received averaged bus and generator signals; and b. range control circuit means operatively connected to receive said detector output signal for algebraically incrementing said detected output signal by said predetermined voltage increment level.

35. An improved automatic synchronizing apparatus for connecting an oncoming AC generator source in parallel with an energized AC bus source according to claim 30, wherein said comparator means includes first and second comparator amplifier circuit means; said first comparator amplifier circuit means being operatively connected to receive said incremented averaged and said bus averaged signals for comparing same and for producing said first comparator output signal in response thereto; said second comparator amplifier circuit means being operatively connected to receive said incremented averaged and said generator averaged signals for comparing same for producing said second comparator output signal in response thereto.

36. An improved automatic synchronizing apparatus for connecting an oncoming AC generator source in parallel with an energized AC bus source according to claim 35, wherein said control circuit means includes means for producing said incremented averaged output signal by subtracting said predetermined voltage increment level from the larger of said averaged bus or generator signals; wherein said first comparator amplifier circuit means includes means for producing said first comparator output signal when the voltage of said incremented averaged signal exceeds that of said received averaged bus signal; and wherein said second comparator amplifier circuit means includes means for producing said second comparator output signal when the voltage of said incremented averaged signal exceeds that of said received averaged generator signal.

37. An improved automatic synchronizing apparatus for connecting an oncoming AC generator source in parallel with an energized AC bus source according to claim 30, wherein said voltage matching circuit means includes means for producing said raise and lower voltage output signals which comprise said output matching signals; and wherein said output means includes raise and lower relay driving circuit means operatively connected respectively to receive said first and second comparator signals for producing continuous raise or lower output signals respectively in response thereto.

38. An improved automatic synchronizing apparatus for connecting an oncoming AC generator source in parallel with an energized AC bus source according to claim 30, wherein said output means includes transistor means connected to sense said first and second comparator output signals for producing said first binary output voltage level when said first and second comparator signals are simultaneously below a threshold level, and for producing said second binary voltage output signal level when said first and second comparator signals are above said threshhold level.

* * * * *

UNITED STATES PATENT OFFICE
CERTIFICATE OF CORRECTION

Patent No. 3,794,846    Dated February 26, 1974

Inventor(s) David W. Schlicher and Denton C. Rowe

It is certified that error appears in the above-identified patent and that said Letters Patent are hereby corrected as shown below:

Claim 2, column 34, line 50, "accordign" should be --according--.

Claim 15, column 39, line 31, "colectively" should be --collectively--; and line 37, "amgle" should be --angle--.

Claim 19, column 41, line 6, between the words "circuit" and "means", insert --includes--.

Claim 20, column 41, line 22, "pahse" should be --phase--.

Claim 24, column 42, line 25, "conicident" should be --coincident--.

Claim 38, column 46, line 17, "threshhold" should be --threshold--.

Signed and sealed this 8th day of October 1974.

(SEAL)
Attest:

McCOY M. GIBSON JR.
Attesting Officer

C. MARSHALL DANN
Commissioner of Patents